United States Patent
Mao et al.

(10) Patent No.: US 12,242,519 B2
(45) Date of Patent: Mar. 4, 2025

(54) METHOD, APPARATUS, AND SYSTEM FOR PROVIDING LINEAR FEATURE DETECTION OF CARTOGRAPHIC FEATURES

(71) Applicant: HERE Global B.V., Eindhoven (NL)

(72) Inventors: Qi Mao, Arlington, TX (US); Zhenhua Zhang, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 18/081,346

(22) Filed: Dec. 14, 2022

(65) Prior Publication Data

US 2024/0202218 A1    Jun. 20, 2024

(51) Int. Cl.
| | |
|---|---|
| G06F 7/00 | (2006.01) |
| G06F 16/29 | (2019.01) |
| G06F 16/901 | (2019.01) |
| G06F 18/213 | (2023.01) |
| G06F 18/231 | (2023.01) |
| G06F 18/24 | (2023.01) |

(52) U.S. Cl.
CPC .......... *G06F 16/29* (2019.01); *G06F 16/9024* (2019.01); *G06F 18/213* (2023.01); *G06F 18/231* (2023.01); *G06F 18/24* (2023.01)

(58) Field of Classification Search
CPC .... G06F 16/29; G06F 16/9024; G06F 16/213; G06F 18/231; G06F 18/24
See application file for complete search history.

(56) References Cited

U.S. PATENT DOCUMENTS

| | | | |
|---|---|---|---|
| 6,268,858 B1 * | 7/2001 | Nathman | G06T 11/203 |
| | | | 701/454 |
| 7,653,218 B1 * | 1/2010 | Malitz | G06V 20/13 |
| | | | 382/113 |
| 11,465,620 B1 * | 10/2022 | Lukarski | B60W 30/12 |
| 11,858,507 B2 * | 1/2024 | Kwon | B60W 30/0956 |
| 2005/0107993 A1 * | 5/2005 | Cuthbert | H04M 3/4872 |
| | | | 703/2 |
| 2007/0071328 A1 * | 3/2007 | Larsen | G06T 7/12 |
| | | | 382/203 |

(Continued)

OTHER PUBLICATIONS

Lin et al., "An automatic lane marking detection method with low-density roadside lidar data", in IEEE Sensors Journal, vol. 21, No. 8, Feb. 8, 2021, pp. 10029-10038.

*Primary Examiner* — Mohammed R Uddin

(57) ABSTRACT

An approach is provided for linear feature detection of cartographic features. The approach, for example, involves receiving a plurality of linear feature detections that represent one or more linear features of a geographic environment and are detected using at least one sensor. The approach also involves clustering the plurality of linear feature detections into at least one cluster and determining that the at least one cluster forms a polygon. The approach further involves cutting the polygon at one or more cut locations to form a plurality of sub-clusters of the plurality of linear feature detections. The approach further involves extracting respective centerlines for the plurality of sub-clusters and connecting the respective centerlines at the one or more cut locations to generate a network graph of the one or more linear features.

13 Claims, 18 Drawing Sheets

(56) References Cited

U.S. PATENT DOCUMENTS

| | | | |
|---|---|---|---|
| 2013/0004084 A1* | 1/2013 | Sakurai | B60W 30/12 382/201 |
| 2013/0028479 A1 | 1/2013 | Nakamori et al. | |
| 2013/0120125 A1 | 5/2013 | Wu | |
| 2014/0133741 A1* | 5/2014 | Wang | G06T 17/05 382/154 |
| 2014/0244164 A1* | 8/2014 | Gale | G01C 21/30 701/446 |
| 2017/0068862 A1 | 3/2017 | Mueter et al. | |
| 2018/0189578 A1* | 7/2018 | Yang | B60W 40/04 |
| 2019/0138024 A1* | 5/2019 | Liang | G01C 21/3878 |
| 2019/0266418 A1* | 8/2019 | Xu | G06V 10/764 |
| 2020/0132477 A1* | 4/2020 | Averilla | G06T 19/00 |
| 2020/0193173 A1 | 6/2020 | Zhang et al. | |
| 2020/0263993 A1* | 8/2020 | Gaal | G01C 21/3691 |
| 2021/0001877 A1* | 1/2021 | Han | B60W 60/001 |
| 2021/0209941 A1* | 7/2021 | Maheshwari | G06V 10/7715 |
| 2022/0121862 A1 | 4/2022 | Stenneth et al. | |
| 2022/0390255 A1* | 12/2022 | Donato | G06T 19/20 |
| 2022/0404823 A1* | 12/2022 | Sham | G05D 1/0016 |
| 2023/0332917 A1* | 10/2023 | Nakajima | G06T 7/13 |

* cited by examiner

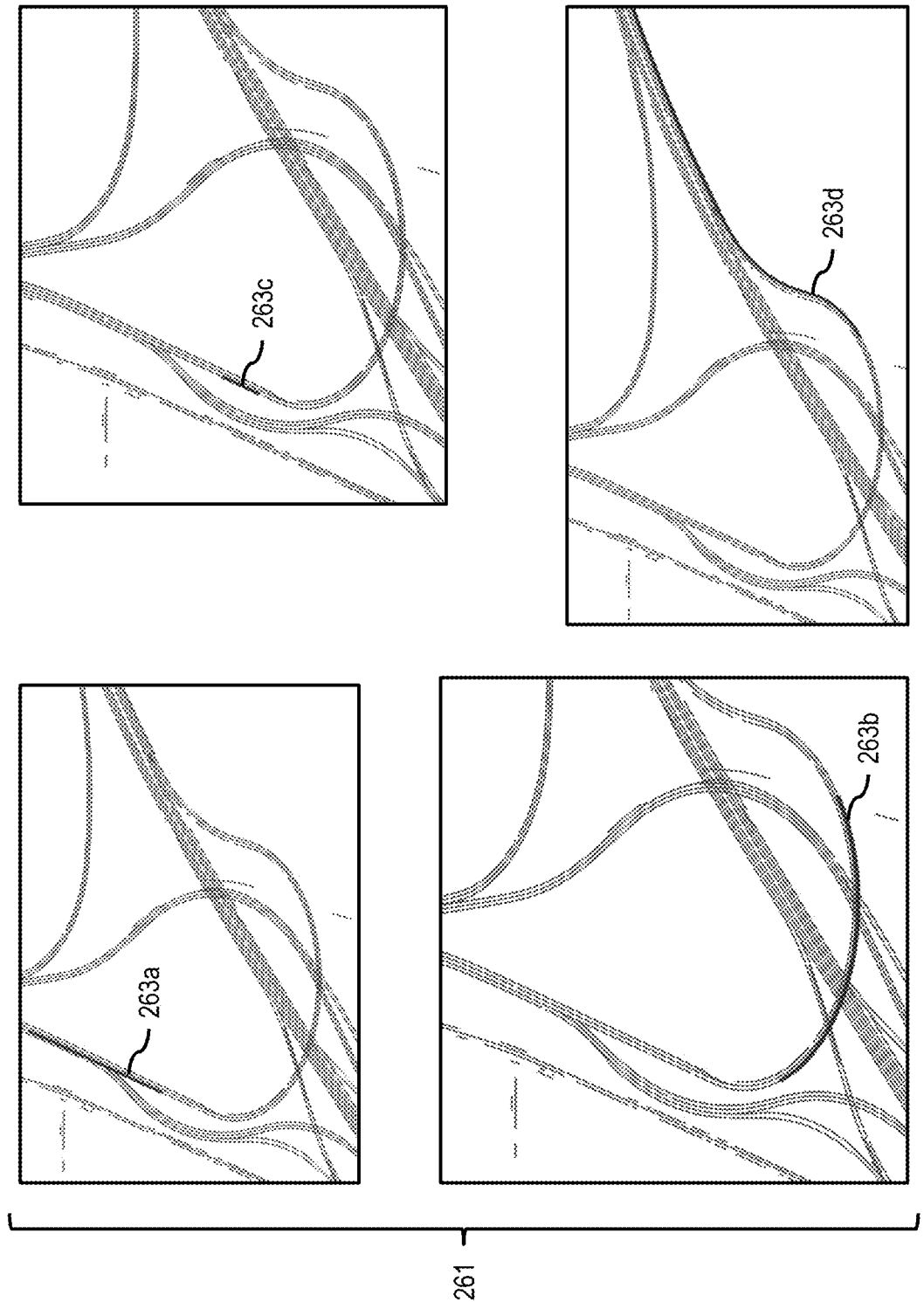

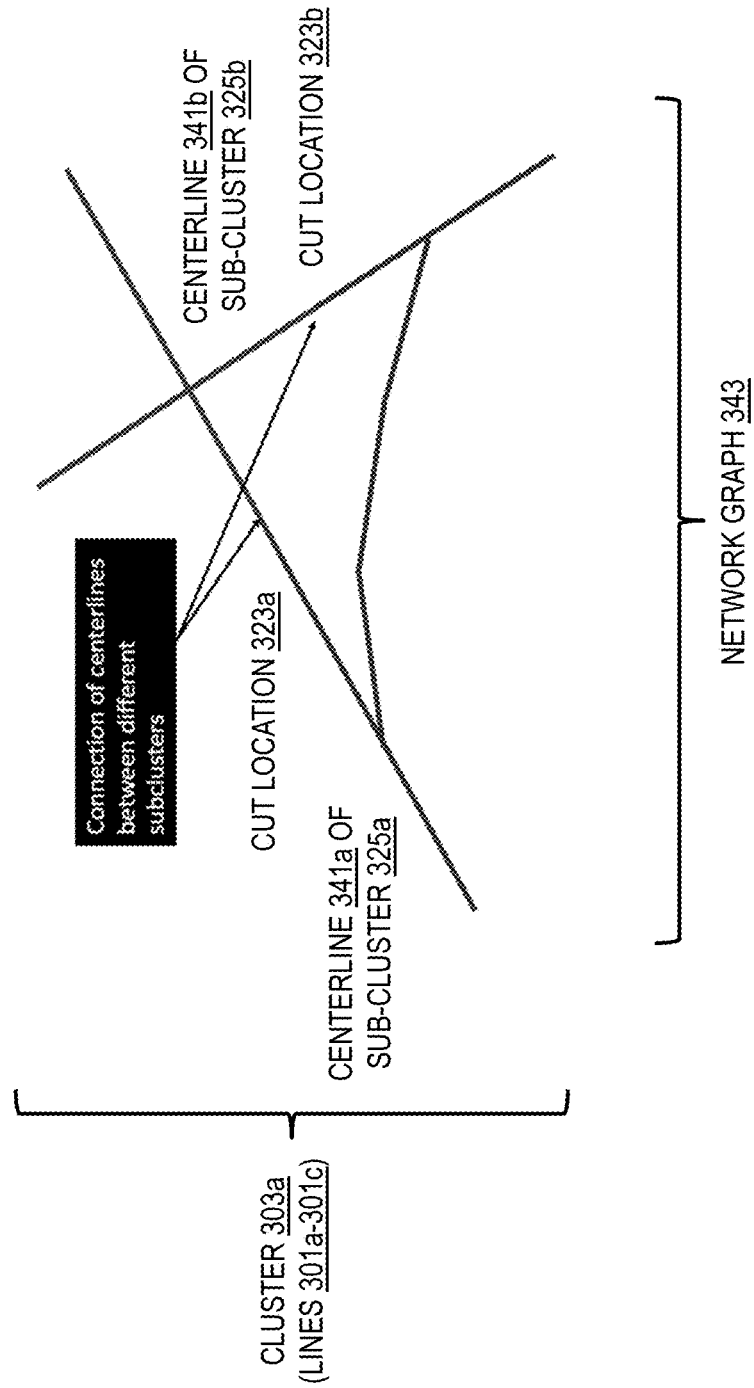

METHOD, APPARATUS, AND SYSTEM FOR PROVIDING LINEAR FEATURE DETECTION OF CARTOGRAPHIC FEATURES

BACKGROUND

Navigation and mapping service providers are continually challenged to provide users up-to-date digital map data. One particular area of interest is the use of computer vision and/or any other type of automated sensor-based system to enable mapping and sensing of road networks in an environment (e.g., to support autonomous or semi-autonomous operation or other location-based applications). For example, one application of vision techniques is mapping or vehicle localization with respect to known linear features of a road such as lane markings, medians, and/or other visible line-like environmental features. However, each detection of a linear feature of a cartographic feature (e.g., road, etc.) can deviate between different sources or instances of detection, particularly when mapping complex cartographic features (e.g., highway interchanges, ramps, etc.). As a result, service providers face significant technical challenges to generate a representation of a linear road feature from multiple sources.

SOME EXAMPLE EMBODIMENTS

Therefore, there is a need for providing consistent and accurate reconstruction of a linear road feature from multiple sources or instances of the feature.

According to one embodiment, a method comprises receiving a plurality of linear feature detections. The plurality of linear features detections represents one or more linear features of a geographic environment that are detected using at least one sensor. The method also comprises clustering the plurality of linear feature detections into at least one cluster. The method further comprises determining that the at least one cluster forms a polygon (e.g., a polygon that has an interior area or hole). The method further comprises cutting the polygon at one or more cut locations to form a plurality of sub-clusters of the plurality of linear feature detections. The method further comprises extracting respective centerlines for the plurality of sub-clusters. The method further comprises connecting the respective centerlines at the one or more cut locations to generate a network graph of the one or more linear features and providing the network graph as an output. In one embodiment, the method further comprises performing a recursive cutting of the plurality of sub-clusters at one or more other cut locations based on determining that the plurality of sub-clusters from respective polygons. Then, the extracting and the connecting of the respective centerlines is based on the recursive cutting.

According to another embodiment, an apparatus comprises at least one processor, and at least one memory including computer program code for one or more computer programs, the at least one memory and the computer program code configured to, with the at least one processor, cause, at least in part, the apparatus to receive a plurality of linear feature detections. The plurality of linear features detections represents one or more linear features of a geographic environment that are detected using at least one sensor. The apparatus is also caused to cluster the plurality of linear feature detections into at least one cluster. The apparatus is further caused to determine that the at least one cluster forms a polygon. The apparatus is further caused to cut the polygon at one or more cut locations to form a plurality of sub-clusters of the plurality of linear feature detections. The apparatus is further caused to extract respective centerlines for the plurality of sub-clusters. The apparatus is further caused to connect the respective centerlines at the one or more cut locations to generate a network graph of the one or more linear features and providing the network graph as an output. In one embodiment, the apparatus is further caused to perform a recursive cutting of the plurality of sub-clusters at one or more other cut locations based on determining that the plurality of sub-clusters from respective polygons. Then, the extracting and the connecting of the respective centerlines is based on the recursive cutting.

According to another embodiment, a computer-readable storage medium carries one or more sequences of one or more instructions which, when executed by one or more processors, cause, at least in part, an apparatus to receive a plurality of linear feature detections. The plurality of linear features detections represents one or more linear features of a geographic environment that are detected using at least one sensor. The apparatus is also caused to cluster the plurality of linear feature detections into at least one cluster. The apparatus is further caused to determine that the at least one cluster forms a polygon. The apparatus is further caused to cut the polygon at one or more cut locations to form a plurality of sub-clusters of the plurality of linear feature detections. The apparatus is further caused to extract respective centerlines for the plurality of sub-clusters. The apparatus is further caused to connect the respective centerlines at the one or more cut locations to generate a network graph of the one or more linear features and providing the network graph as an output. In one embodiment, the apparatus is further caused to perform a recursive cutting of the plurality of sub-clusters at one or more other cut locations based on determining that the plurality of sub-clusters from respective polygons. Then, the extracting and the connecting of the respective centerlines is based on the recursive cutting.

According to another embodiment, an apparatus comprises means for receiving a plurality of linear feature detections. The plurality of linear features detections represents one or more linear features of a geographic environment that are detected using at least one sensor. The apparatus also comprises means for clustering the plurality of linear feature detections into at least one cluster. The apparatus further comprises means for determining that the at least one cluster forms a polygon. The apparatus further comprises means for cutting the polygon at one or more cut locations to form a plurality of sub-clusters of the plurality of linear feature detections. The apparatus further comprises means for extracting respective centerlines for the plurality of sub-clusters. The apparatus further comprises means for connecting the respective centerlines at the one or more cut locations to generate a network graph of the one or more linear features and providing the network graph as an output. In one embodiment, the apparatus further comprises means for performing a recursive cutting of the plurality of sub-clusters at one or more other cut locations based on determining that the plurality of sub-clusters from respective polygons. Then, the extracting and the connecting of the respective centerlines is based on the recursive cutting.

According to one embodiment, a method comprises receiving a plurality of linear feature detections. The plurality of linear features detections represents one or more linear features of a geographic environment that are detected using at least one sensor. The method also comprises designating one or more linear feature detection pairs comprising two different linear feature detections of the plurality of linear feature detections. The method further comprises performing a classification of one or more linear feature detection pairs into a must-link category or a cannot-link category. The method further comprises clustering the plurality of linear feature detections into at least one cluster based on the classification. The method further comprises generating a network graph of the one or more linear features based on the clustering.

According to another embodiment, an apparatus comprises at least one processor, and at least one memory including computer program code for one or more computer programs, the at least one memory and the computer program code configured to, with the at least one processor, cause, at least in part, the apparatus to receive a plurality of linear feature detections. The plurality of linear features detections represents one or more linear features of a geographic environment that are detected using at least one sensor. The apparatus is also caused to designate one or more linear feature detection pairs comprising two different linear feature detections of the plurality of linear feature detections. The apparatus is further caused to perform a classification of one or more linear feature detection pairs into a must-link category or a cannot-link category. The apparatus is further caused to cluster the plurality of linear feature detections into at least one cluster based on the classification. The apparatus is further caused to generate a network graph of the one or more linear features based on the clustering.

According to another embodiment, a computer-readable storage medium carries one or more sequences of one or more instructions which, when executed by one or more processors, cause, at least in part, an apparatus to receive a plurality of linear feature detections. The plurality of linear features detections represents one or more linear features of a geographic environment that are detected using at least one sensor. The apparatus is also caused to designate one or more linear feature detection pairs comprising two different linear feature detections of the plurality of linear feature detections. The apparatus is further caused to perform a classification of one or more linear feature detection pairs into a must-link category or a cannot-link category. The apparatus is further caused to cluster the plurality of linear feature detections into at least one cluster based on the classification. The apparatus is further caused to generate a network graph of the one or more linear features based on the clustering.

According to another embodiment, an apparatus comprises means for receiving a plurality of linear feature detections. The plurality of linear features detections represents one or more linear features of a geographic environment that are detected using at least one sensor. The apparatus also comprises means for designating one or more linear feature detection pairs comprising two different linear feature detections of the plurality of linear feature detections. The apparatus further comprises means for performing a classification of one or more linear feature detection pairs into a must-link category or a cannot-link category. The apparatus further comprises means for clustering the plurality of linear feature detections into at least one cluster based on the classification. The apparatus further comprises means for generating a network graph of the one or more linear features based on the clustering.

In addition, for various example embodiments described herein, the following is applicable: a computer program product may be provided. For example, a computer program product comprising instructions which, when the program is executed by a computer, cause the computer to perform any one or any combination of methods (or processes) disclosed.

In addition, for various example embodiments described herein, the following is applicable: a computer program product may be provided. For example, a computer program product comprising instructions which, when the program is executed by a computer, cause the computer to perform any one or any combination of methods (or processes) disclosed.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 2A-2D are diagrams illustrating example challenges associated with clustering linear feature detections, according to one example embodiment;

FIGS. 3A-3C are diagrams illustrating an example pipeline for providing linear feature detection of cartographic features, according to one example embodiment;

DESCRIPTION OF SOME EMBODIMENTS

Examples of a method, apparatus, and computer program for provide linear feature detections of cartographic features are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
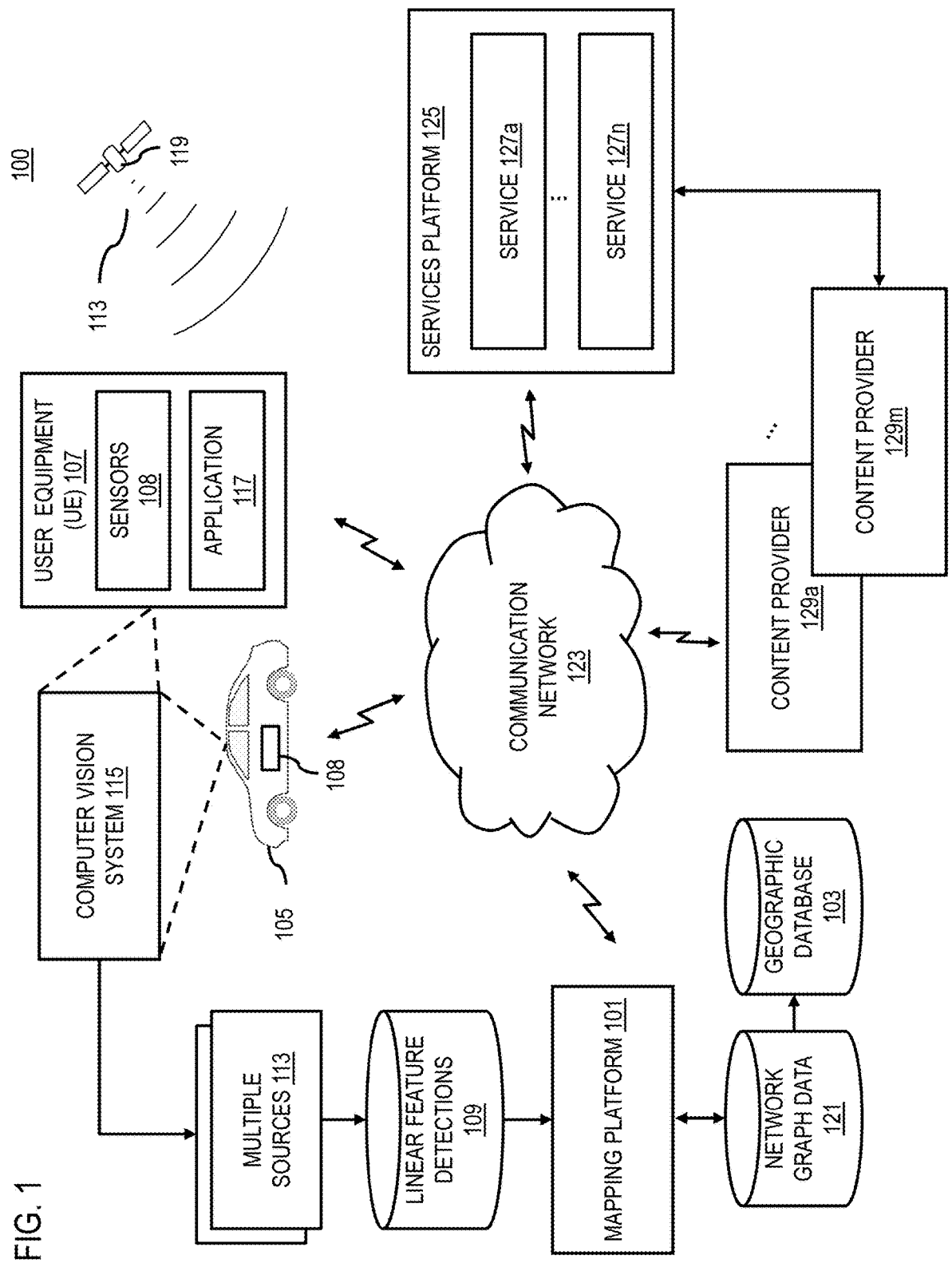
FIG. 1 is a diagram of a system capable of providing linear feature detection of cartographic features, according to one example embodiment.

FIG. 1 is a diagram of a system 100 capable of providing linear feature detection of cartographic features, according to one example embodiment. Mapping and navigation service providers (e.g., operators of a mapping platform 101) face significant technical challenges with respect to generating accurate maps (e.g., digital map data of a geographic database 103) of cartographic features that can be used to facilitate applications such as, but not limited to, autonomous driving, lane-level localization, lane-level navigation routing, and/or the like. One class of cartographic features that is of interest for such applications includes linear features of a road. This is because linear features often define boundaries of a road or one or more lanes of the road (e.g., via lane markings). Thus, by mapping such linear features, mapping and navigation service providers enable vehicles 105 (e.g., autonomous, semi-autonomous, and/or manually operated vehicles), user equipment (UE) devices 107 (e.g., smart phones, personal navigation devices, etc.), etc. to have situational awareness of their locations relative to these linear features (e.g., to detect when they are driving within the boundaries or lanes of a road or segment thereof).

By way of example, a linear feature may correspond to or otherwise indicate a border of the road link segment (and/or a border of a lane of the link segment), where the border may be represented by one or more of lane markings, guardrails, road curbs, road medians, road barriers, and/or the like. In other examples, the linear feature can also be any line-based object or road furniture (e.g., an object whose dimensions can be represented as a line segment or polyline) occurring on or within a threshold proximity of the road. For example, a line-based object can include, but is not limited to, fences, overhead power lines, linearly arranged lights, and/or the like. In yet another example, a linear feature can be a vehicle path (also referred to as a drive path) on the road link segment where the vehicle path is described by a sequence of two or more location data points determined using a sensor 108 (e.g., a positioning sensor such as a satellite-based positioning system such as but not limited to GPS or any other Global Navigation Satellite System (GNSS)) of the vehicle 105 or other mobile device as it travels or drives.

Linear features such as lane markings are critically important features in modern transportation systems since they help to reduce road accidents, control traffic, and avoid road obstruction to ensure safe driving. It is noted that although the various embodiments described herein discuss lane markings as example of linear features, it is contemplated that any other type of linear feature (e.g., medians, paths, terrain boundaries, building footprints, political boundaries, and/or any other cartographic feature that has linear or curved segments) can be used according to the various embodiments described herein. In the area of map making, the automation of the detection of lane markings and/or any type of linear feature detections 109 is particularly applicable for autonomous driving by automatically updating lane markings (or any other type of linear features) in digital map data (e.g., the geographic database 103) using fresh data. However, this map making and update process based on linear feature detections 109 still faces many technical challenges, even though modern technologies can provide plenty of sources (e.g., multiple sources 113) with lane marking detections (e.g., linear feature detections 109), such as but not limited to sensor data by on-board vehicle cameras (e.g., sensors 108) and computer vision system(s) 115, by UEs 107 via sensors 108 and applications 117 in combination with computer vision systems 115, by satellites 119 and/or other aerial vehicles collecting satellite or aerial imagery.

One of the key challenges in automating lane marking mapping using linear feature detections 109 from multiple sources 113 (e.g., different data providers, vehicles 105, UEs, 107 satellites 112, etc.) is to group lane marking detections (e.g., linear feature detections 109) into semantically meaningful clusters so that lane markings or other linear features can be created with a set of mostly relevant linear feature detections 109. In one embodiment, this step not only filters out irrelevant linear feature detections 109

(e.g., lane marking detections that should not be grouped in a cluster) but also improves the location accuracy. However, there are several technical challenges in clustering two linear features as discussed with respect to FIGS. 2A-2D, which are diagrams illustrating example challenges associated with clustering linear feature detections and dealing with multiple sources 113.

Figure 2A:
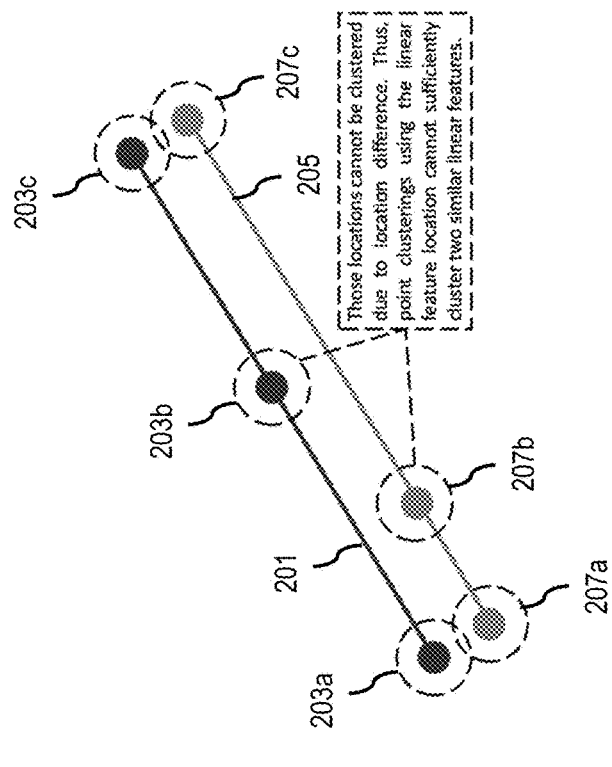

FIG. 2A illustrates the technical challenges associated with how to define the similarity between two linear features (e.g., linear feature detection 201 comprising including location points 203a, 203b, and 203c; and linear feature detection 205 including location points 207a, 207b, and 207c). Generally, linear features are constituted by a sequence of points with varied sampling rate, heading, length, and location. Thus, traditional point clustering methods cannot capture the linear similarity between linear features. For example, as shown, location point 203b of linear feature detection 201 and location point 207b of linear feature detection 205 cannot be clustered due to their location difference. Thus, point clusterings using linear feature location points cannot sufficiently cluster two similar linear feature detections 201 and 205 in this case.

Figure 2B:
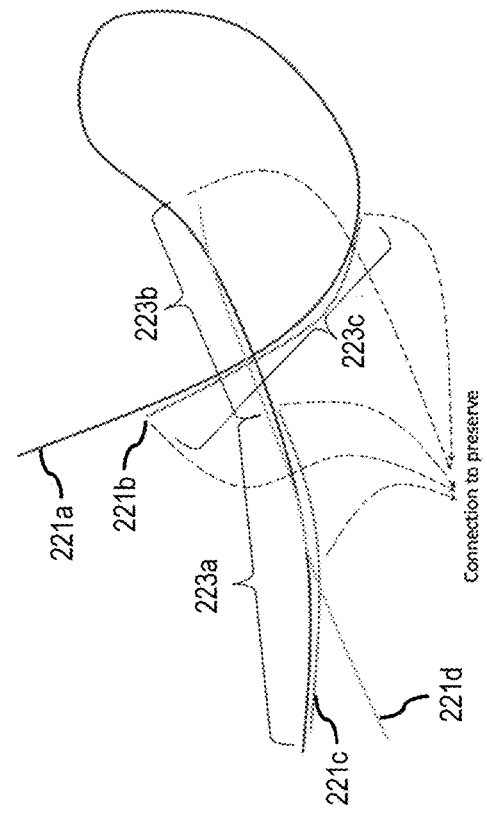

FIG. 2B illustrates the technical challenges associated with how to realize partial clustering. Sometimes, only part of one linear feature detection is similar to another linear feature detection. In the example of FIG. 2B, four linear feature detections 221a-221d are to be clustered but they only partially overlap. The technical problem is how to achieve well separable clusters in a proper granularity (e.g., clusters 223a-223c), from which lane marking (or any other linear feature) geometry can be easily extracted and the topology connections of lane markings (or any other linear feature) can be well preserved.

Figure 2C:
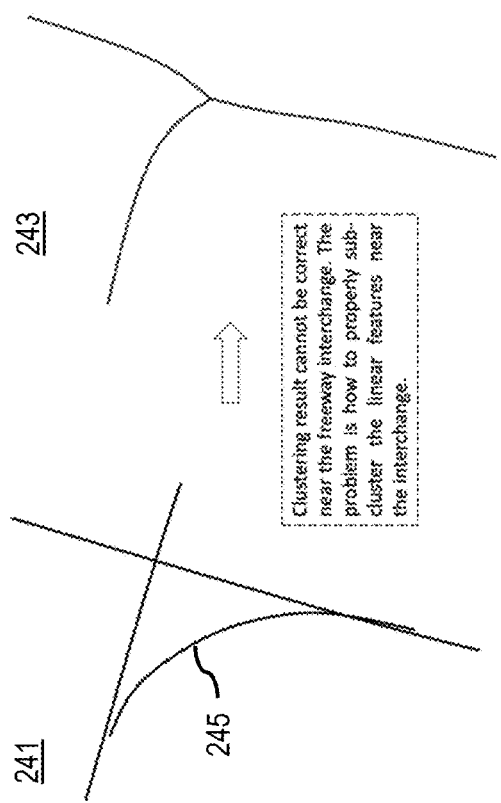

FIG. 2C illustrates the technical challenges associated with how to form proper clusters near freeway interchanges or any other similarly complex cartographic feature. In this example, a set 241 of linear feature detections are determined for a freeway interchange. However, the linear features in the set 241 can be put into the same cluster with large inner areas where roads are represented mostly as curvatures that are highly connected with each other. In most cases, the traditional clustering result 243 is one big cluster for all linear feature detections, which can result in loss of certain features that should be present. For example, ramp 245 has been incorporated by the traditional clustering algorithm into one big cluster such that ramp 245 is no longer distinct and separate in the clustering result 243). Thus the clustering result 243 cannot be correct near this example freeway interchange. The technical problem is then how to properly sub-cluster the set 241 of linear feature detections near complex network topology to preserve as many network features as possible (e.g., ramp 245).

FIG. 2D illustrates the technical challenges associated with using linear feature detections 109 from different sensor providers. In this example, a set 261 of linear feature detections includes different linear feature detections received from different sensor providers that only partially overlap in area of interest near a freeway exchange. A long linear feature detection from one source can have multiple sub-regions 263a-263d), each of which is similar to an individual lane marking detection from another source. It becomes technically difficult to decide how many clusters should be formed and which cluster the long lane marking detection should belong to.

For geospatial data, clustering methods are often used for grouping point data such as road signs. The commonly used approach includes k-means clustering, spectral clustering, hierarchical clustering, community detection, and DBSCAN. These methods can be adapted for clustering linear features like lane marking detections. A resulting technical challenge is how to define the similarity or distance between two linear features. Some existing distance metrics can be explored such as dynamic time warping for two time series, Fréchet distance for two curves, and Hausdorff distance for two sets of points. However, neither of the combinations of clustering methods and distance functions can achieve linear feature clusters (e.g., lane marking clusters) in proper granularity for linear feature creation and mapping since these distance functions are often sensitive to the varied length, curvature, sampling rate, and noise of linear feature detections 109. Moreover, and the clusters generated by traditional methods often neglect the global topology structure of lane markings/linear features including split/merge, curves, and intersection, which later lead to various artifacts such as gaps, duplicates, incorrect connections at different Z-levels, and missing global topology connections. All these artifacts are often caused by the challenges of linear feature detections described above.

To address these technical challenges, the system 100 of FIG. 1 introduces a new pipeline linear feature detection and clustering. In one embodiment, this pipeline includes:
 (1) A network-based clustering method is introduced to compute the similarity between two linear feature detections 109 (e.g., two lane marking detections):
  This clustering method is area clustering instead of point-clustering.
  This clustering method measures the similarity of both locations and headings of the input linear features.
  This clustering method is robust near the elevated intersection where two roads cross each other at different elevations.
 (2) A network-based sub-clustering method is proposed to improve the clustering quality near the freeway interchange.
  A robust cut detection method is proposed to divide the clusterings with large inner areas (e.g., clusters of linear feature detections 109 that form a polygon with interior/inner areas/holes) into sub-clusters.
  A connected component method is proposed to recursively divide the sub-clusters until the polygon constructed from the linear feature detections 109 (e.g., lane marking detections) in each cluster does not include large inner areas (e.g., inner areas above a threshold size).

The various embodiments described herein for clustering and providing linear feature detections and network graph data 121 (e.g., a road network graph for storage in the geographic database 103) has many advantages such as but not limited to:
 The system 100 imposes no restriction on the length, curvature, and/or sampling rate of linear feature detections 109 (e.g., lane marking detections), while traditional methods often apply some heuristics to increase the sampling rate or cut lane marking detections as a preprocessing step to cater to the requirements of the clustering methods used.
 The system 100 leverages linear feature topology (e.g., lane marking topology) knowledge to cut linear feature detections 109 (e.g., lane marking detections) into parts that can be best assigned to corresponding clusters, so the output of the system 100 does not include ambiguous clusters. In traditional approaches, ambiguity causes many issues in linear feature/lane marking creation such as duplicates, gaps, missing connections near split/merge, or incorrect connections near junctions, which must be alleviated by dedicated postprocessing. However, this postprocessing is also difficult and cannot deal with varied cases.

The system 100 method can automatically return the optimal number of clusters based on the property of the polygon formed by the inner areas of linear feature detections 109. However, traditional clustering approaches (e.g., hierarchical clustering among others) need to provide the cutoff based on a fixed distance threshold, which can be difficult to adapt for all situations. In addition, clusters generated by a hard cutoff may not have a physical meaning, which can make the linear feature/lane marking extraction more technically challenging.

Figure 3A:
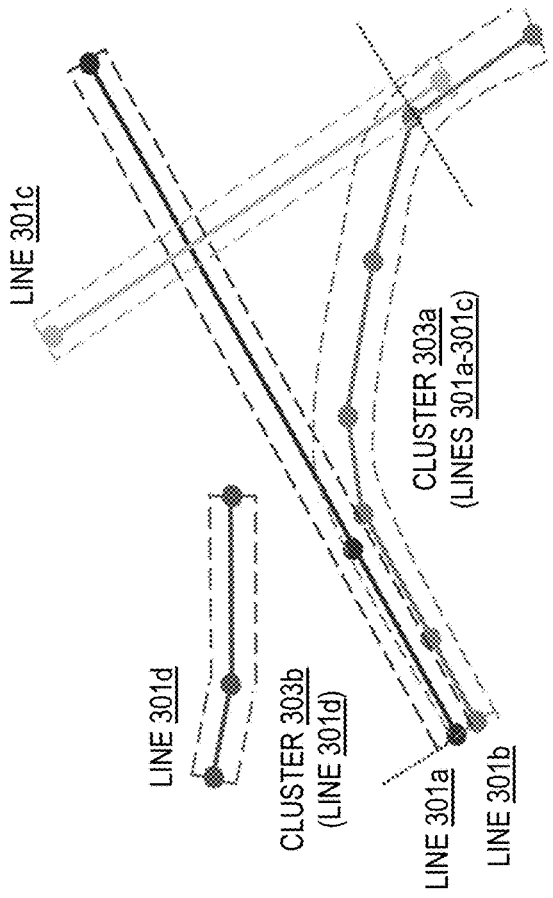
Figure 3B:
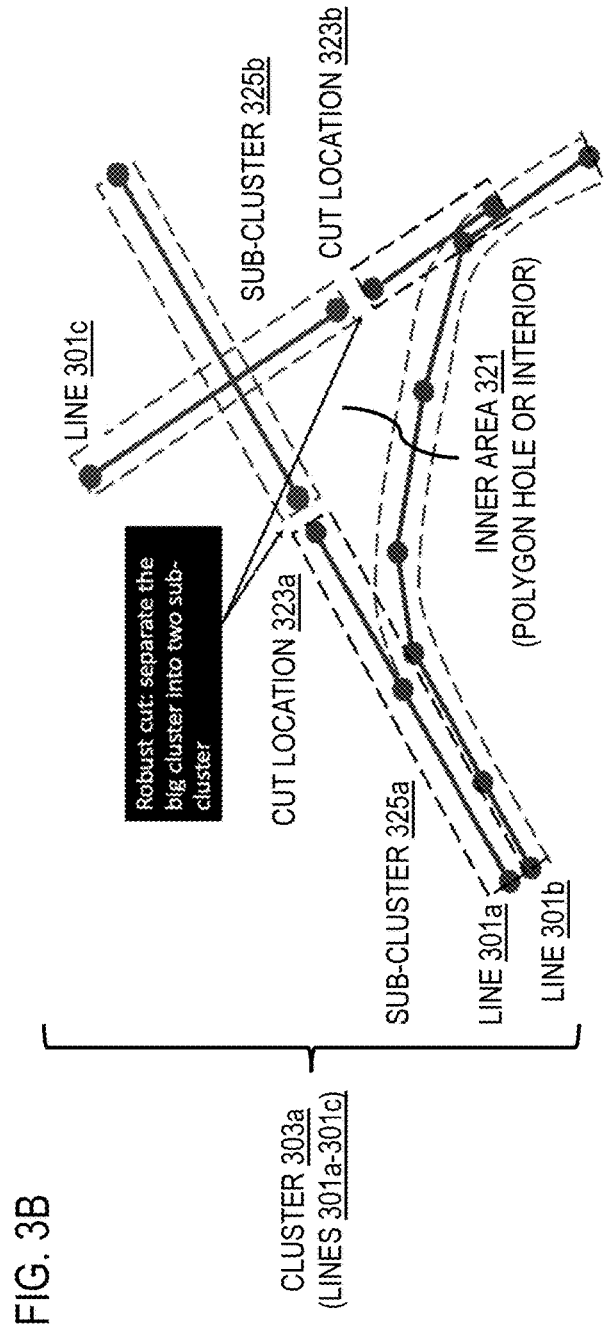

FIGS. 3A-3C is a diagram illustrating an example pipeline for providing linear feature detection of cartographic features, according to one example embodiment. More specifically, FIG. 3A illustrates the beginning of the pipeline in which network-based clustering is first performed on a set of four linear feature detections 301a-301d. The clustering is based on a customized similarity metric (e.g., taking into account heading, intersection, angles between links, etc.) to generate cluster 303a including linear feature detections 301a-301c and cluster 303b including linear feature detection 301d. The clustering counters the effect of differences of point density, location, and heading between the linear feature detections 301a-301d.

FIG. 3B illustrates the portion of the pipeline that looks for loops or polygons formed within any of the clusters 303a and 303b. In this example, cluster 303b contains just one linear feature detection 301d and does not form a loop or polygon. Instead the linear feature detection 301d is a line segment with a slight bend. In contrast, cluster 303a contains three linear feature detections 301a-301c of road links that form a freeway interchange that form a polygon with an inner area 321 (e.g., a polygon interior or hole). To preserve the inner area 321 in the output representation of the cluster, the system 100 can cut the linear feature detections 301a and 301c at respective cut locations 323a and 323b to create sub-cluster 325a and sub-cluster 325b. In other words, the system 100 performs network-based sub-clustering near the freeway interchange with robust cuts. This results in separating the big cluster 303a near the interchange into smaller clusters 325a and 325b. This also resolves the inner loop or area 321 within the big cluster 303a so that the freeway interchange topology or connection represented by linear feature detection 301b is preserved. If clustering with the cut was performed instead, it is likely that the linear feature detections 301a-301c of the big cluster 303a would have been merged into two intersecting lines and the ramp feature represented by linear feature detection 301b would have been lost.

FIG. 3C illustrates a portion of the pipeline where the network graph of the linear feature (e.g., lane markings) represented by linear feature detections 301a-301c are generated. In one embodiment, the centerline of 341a of sub-cluster 325a of the cluster 303a and the centerline 341b of sub-cluster 325b are determined. The centerlines 341a and 341b are then rejoined at the respective cut locations 323a and 323b to generate the network graph 343 of the freeway interchange. In other words, the system 100 extracts the centerlines 341a and 341b of each sub-cluster 325a and 325b and connects the cut locations 323a and 323b.

In one embodiment, the network graph 343 (or any other network graph generated by the system 100) can be stored as network graph data 121 which, in turn, can be used to generate the digital map data of the geographic database 103. The network graph data 121 and/or the geographic database 103 derived from the network graph data 121 can be provided as an output (e.g., over a communication network 123). This output can then be used by a services platform 125, one or more services 127a-127n (also collectively referred to as services 127) of the services platform 125, one or more content providers 129a-129m (also collectively referred to as content providers 129) to perform one or more functions or provide one or more services (e.g., location based services such as but not limited to autonomous vehicle operation, mapping, navigation, and/or the like).

Figure 4:
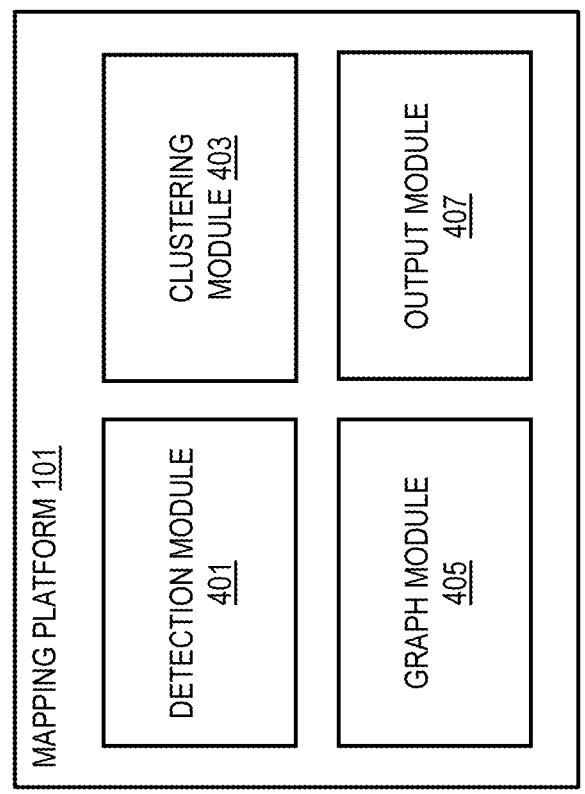
FIG. 4 is a diagram of components of a mapping platform capable of providing linear feature detection of cartographic features, according to one example embodiment.

FIG. 4 is a diagram of components of a mapping platform 101 capable of providing linear feature detection of cartographic features, according to one example embodiment. In one embodiment, as shown in FIG. 4, the mapping platform 101 includes one or more components for providing linear feature detections 109 and/or network graph data 121 according to the various example embodiments described herein. In one example embodiment, the mapping platform 101 includes a detection module 401, a clustering module 403, a graph module 405, and an output module 407. The above presented modules and components of the mapping platform 101 can be implemented in hardware, firmware, software, circuitry, or a combination thereof. Though depicted as a separate entity in FIG. 1, it is contemplated that the mapping platform 101 may be implemented as a module of any of the components of the system 100 (e.g., a component of the services platform 125, services 127, content providers 129, vehicle 105, UE 107, computer vision system 115, application 117, and/or the like). In another embodiment, one or more of the modules 401-407 may be implemented as a cloud-based service, local service, native application, circuitry, or combination thereof. The functions of the mapping platform 101 and modules 401-407 are discussed with respect to the figures discussed below.

Figure 5:
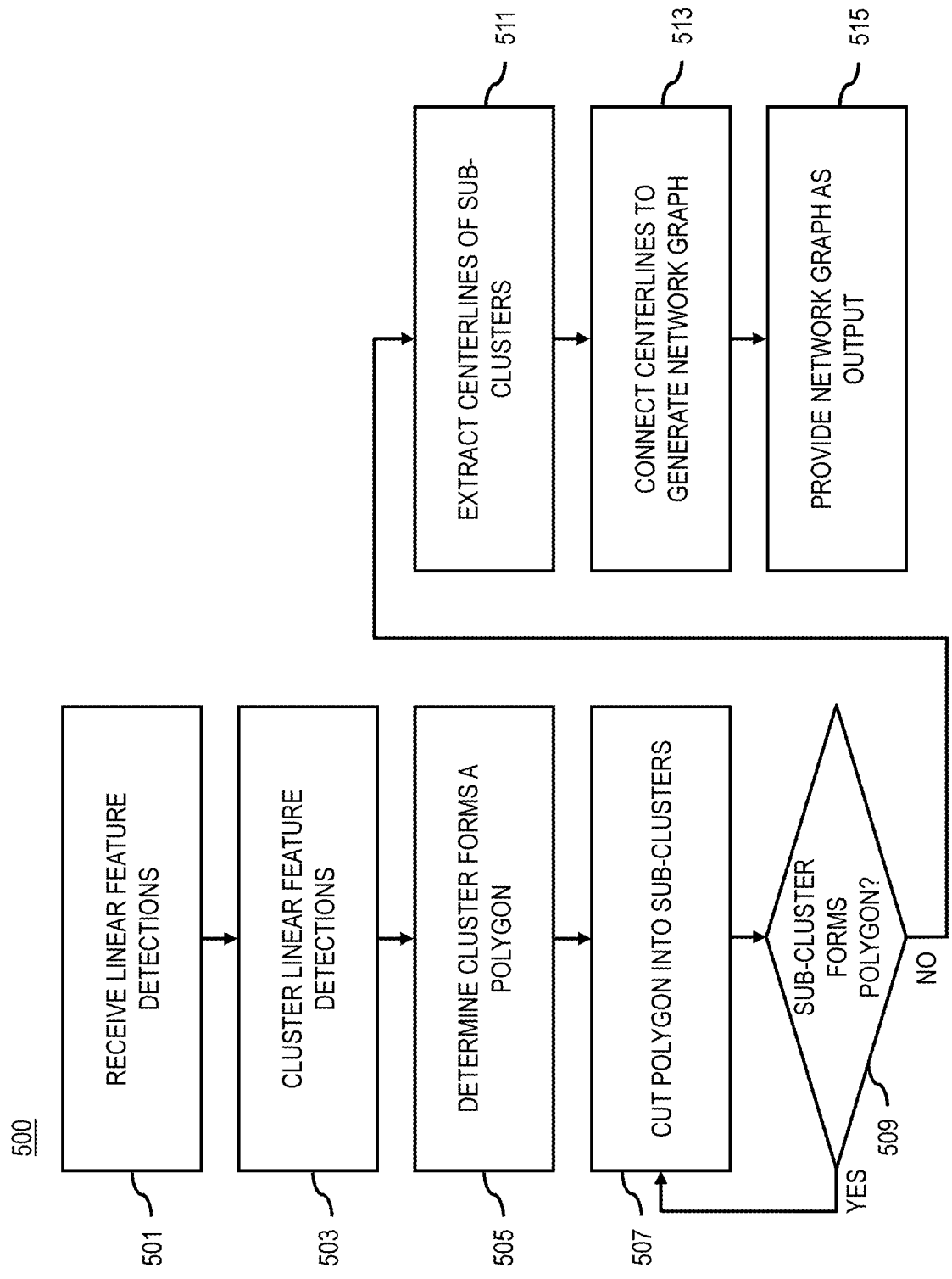
FIG. 5 is a flowchart of a process for providing linear feature detection of cartographic features, according to one example embodiment.
Figure 12:
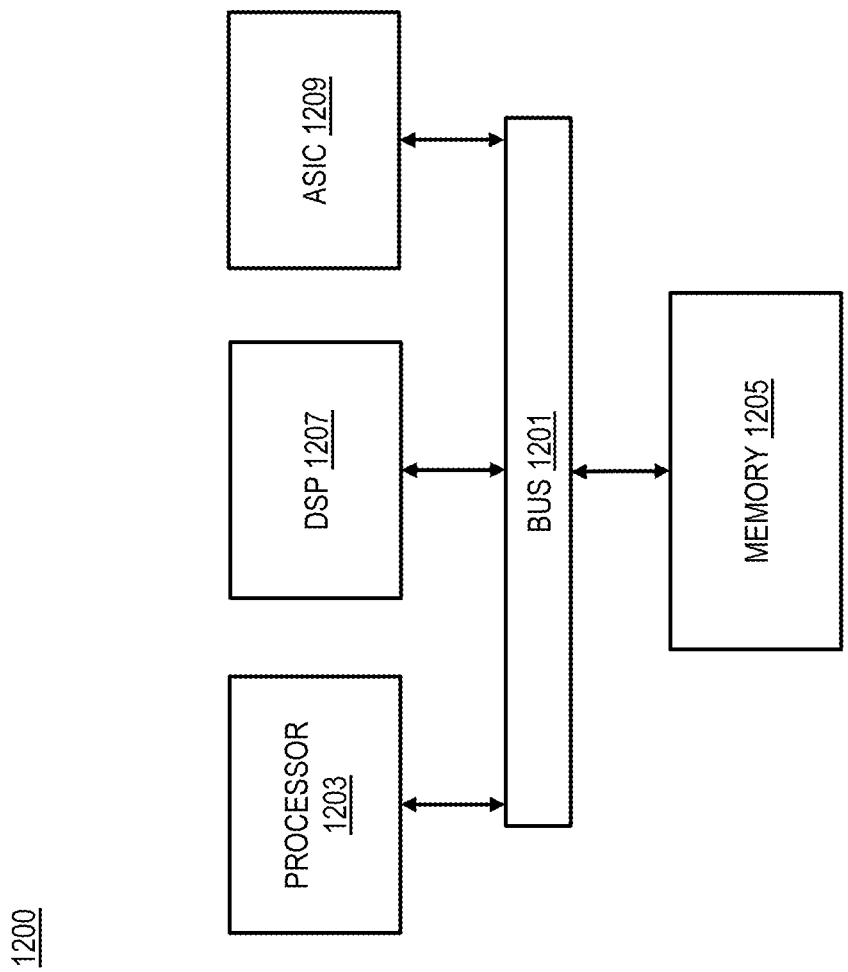
FIG. 12 is a diagram of a chip set that can be used to implement an embodiment.

FIG. 5 is a flowchart of a process 500 for providing linear feature detection of cartographic features, according to one example embodiment. In various embodiments, the mapping platform 101 and/or any of the modules 401-407 may perform one or more portions of the process 500 and may be implemented in, for instance, a chip set including a processor and a memory as shown in FIG. 12. As such, the mapping platform 101 and/or any of the modules 401-407 can provide means for accomplishing various parts of the process 500, as well as means for accomplishing embodiments of other processes described herein in conjunction with other components of the system 100. Although the process 500 is illustrated and described as a sequence of steps, it is contemplated that various embodiments of the process 500 may be performed in any order or combination and need not include all of the illustrated steps.

In step 501, the detection module 401 receives a plurality of linear feature detections 109. The plurality of linear features detections represents one or more linear features (e.g., lane markings, medians, guardrails, powerlines, etc.) of a geographic environment (e.g., that are detected using at least one sensor 108. In various example embodiments, vehicles 105, UEs 107 (e.g., executing respective applications 117 for generating and reporting linear feature detections 109 from sensor data/image data), satellites 119, and/or any other devices capable of traveling over a road network can be used to collect linear feature detections 109 for reconstructing linear features of a road. For example, a computer vision system 115 (e.g., system comprising cameras and object recognition systems or equivalent) or equivalent on-board cameras of vehicles 105 and/or UEs 107 can detect road linear features such as, but not limited to, lane markings, road boundaries, medians, curbs, and/or the like. These features define the bounds of drive lanes and are useful components in lane-based autonomous driving or other equivalent location-based applications. Various example embodiments are provided for determining, from vehicle sensor data (e.g., image data, GPS locations), the plurality of linear feature detections 109 associated with a road link segment. For instance, the linear feature detections may correspond to sensor observations (e.g., image data) that are indicative of a linear feature. In one example embodiment, a linear feature detection can represent a road linear feature (or portion thereof) as a line segment delimited by two feature points (e.g., end points of the line segment) corresponding to points on the linear feature detected from the image data (or other equivalent sensor data).

The linear feature detection 109 is represented by a line formed by a sequence of location points with a start location and end location with possibly one or more intermediate points between the start location and end location (e.g., depending on sampling frequency, data density, etc.). In other words, the linear feature detection 109 can be a polyline (e.g., linear data) and each point of the polyline corresponds to an observed or sensed location of at least one point of the linear feature.

In summary, the general data features of line data in a linear feature detection 109 include, but is not limited to, one or more of the following:

(1) The linear feature detections 109 are constituted by at least one set of two or more feature points (e.g., location data points such as GPS points or equivalent) such that each set of two feature points represent a segment of the linear feature as a line. Multiple sets of the feature points can then form a polyline representation of the linear feature detection 109. A location of a feature point, for instance, refers to a set of geocoordinates (e.g., latitude, longitude, and altitude) indicating a point location (e.g., a beginning, end, or other detected point of a line or linear feature).

(2) Each set of two or more feature points describes a line segment along the corresponding linear feature with or without heading information.

(3) Feature or location data points in each set is in sequence but may be without clear driving or travel direction, or the driving direction may not be consistent (e.g., when linear detections by multiple vehicles 105 traveling in opposite directions on a road).

Based on the above general data, the linear feature detections 109 can include location data points that are ordered (e.g., the location data points are received with a travel direction) or unordered (e.g., the location data points are received with no indication of a travel direction) and grouped into at least one set of location data points. Each set represents a separate portion of the line feature.

Different from point-based data, linear data often cannot be directly used as the input to clustering methods such as the k-means clustering since those clustering methods require the computation of a centroid or mean of the cluster. In contrast, distance-based approach relying on pairwise distance or similarity does not have the above limitation. Network-based methods including simple connected component method, spectral clustering, hierarchical clustering, and community detection first must build a graph network and then apply corresponding clustering method to the network to get the clusters.

In one embodiment, the detection module 401 can use a simple and fast method like connected component analysis (or equivalent analysis) with unweighted network so that the similarity function can be specially customized to directly rule out some pairs of linear feature detections 109 (e.g., lane marking detections) that absolutely should not be grouped into a single cluster. As used herein, these linear feature detection pairs that should not be grouped together are referred to as "cannot-link" pairs. All other linear feature detection pairs not classified as cannot-link pairs are referred to as "must-link" pairs.

Figure 6:
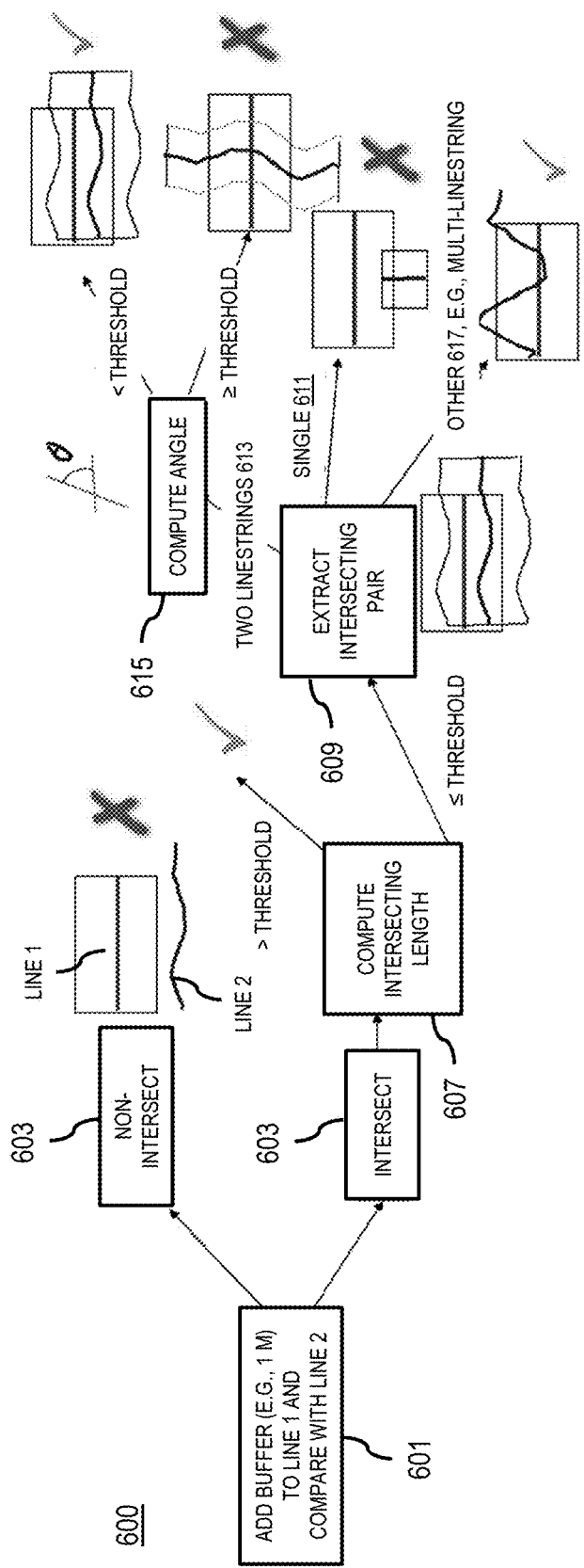
FIG. 6 is a diagram illustrating an example logic process for classifying pairs of linear feature detections, according to one example embodiment.

FIG. 6 is a diagram illustrating an example logic process for classifying pairs of linear feature detections, according to one example embodiment. More specifically, FIG. 6 shows how to determine if a linear pair of lane marking detections 109 is a cannot-link pair or a must-link pair in a hierarchical tree structure that is analogous to the decision tree in the inference stage.

According to FIG. 6, given a pair of linear feature detections (e.g., lane marking detections Line 1 and Line 2), the determination logic forms a decision tree 600. As shown in FIG. 6, Line 1 is represented as a straight line and Line 2 is represented as a squiggly line. The goal is to classify a pair of linear feature detections (e.g., lane marking detections Line 1 and Line 2) as either a cannot-link pair or a must-link pair for the clustering step further below. In one embodiment, the following decision paths are executed sequentially, Step 601—the detection module 401 adds a buffer area to L1 with buffer size $\beta$ (e.g., 1 meter or any other designated value) and check if the buffered Line 1 intersects with Line 2 (step 603). If there is a non-intersection of the pair, the pair is classified as a cannot-link pair (e.g., placed in the cannot-link category indicated by the symbol "X" in FIG. 6). Otherwise, if there is an intersection of the pair (at step 605), the process proceeds to step 607.

Step 607—The detection module 401 computes the intersecting length as the total length of Line 2 within buffered Line 1. If the length is larger than a threshold value $\alpha$ (e.g., 10 meters or any other designated value), the pair is classified as a must-link (e.g., placed in the must-link category indicated by the check mark in FIG. 6) and the process exits. If the length is less than or equal to the threshold value $\alpha$, the process proceeds to step 609.

Step 609, the detection module 401 extracts the mutual intersecting pair. For example, three cases can be found:

1. If there is one single linestring 611 found as intersecting, the pair is classified as cannot-link pair, and the process exits.
2. If there are two linestrings 613 found as mutually intersecting, the process proceeds to step 615.
3. Otherwise, the pair is classified as a must-link pair at step 617, and the process exits.

Step 615—the detection module 401 calculates the angle between the two linestrings 613. In one embodiment, the two linestrings 613 are very short within a designated buffer size (e.g., two times the buffer size of step 601), so the angle is computed by two lines after fitting each linestring as a line. If the angle is smaller than a threshold value $\theta$ (e.g., 10 degree or any other designated value), the pair is classified as a must-link pair, and otherwise the pair is classified as a cannot-link pair.

In one embodiment, given a set of linear feature detections 109 (e.g., lane marking detections), the detection module 401 classifies each pair of linear feature detections 109 in the set and builds a network graph with pairs that are classified as must-link pairs (e.g., placed in the must-link category). The connected components, for instance, are found in the must-link pair network, and each component is considered as a cluster.

The rationale behind the above logic is that the cannot-link pair(s) found in steps 601 and 609 corresponding to the linear feature (e.g., lane marking) of Line 2 are away from the linear feature detection associated with Line 1, while those found in step 615 come from different traffic flows near intersections or junctions. All these cannot-link pairs should not be grouped together. One may ask the question is it proper to have a must-link pair as found in step 607 since it may also have intersecting length and angle condition satisfied for a cannot-link pair. However, these cases generally happen only when there is a large inner area after building a polygon from the pair. After recursively cutting these lane marking detections, these cases will disappear finally. On the other hand, the proposed recursive clustering logic simplifies the pairwise similarity calculation for lane marking detections.

In summary, in one embodiment, the detection module 401 can pre-process the plurality of linear feature detections 109 by designating a linear feature detection pair comprising two of the plurality of linear feature detections 109. The detection module 401 then performs a classification of the linear feature detection pair as a must-link pair or a cannot-link pair. In one embodiment, the classification is based on whether the linear feature detection pair intersect, an intersecting length, or a combination thereof. In some cases, the classification is based an angle formed between the linear feature detection pair (e.g., linestrings of the pair). Then, the must-link pairs are provided for clustering in step 503 below such that the clustering of the plurality of linear feature detections is based on the classification. In one other words, in this embodiment, the clustering of the plurality of linear feature detections is based on the linear feature detection pair being classified as the must-link pair.

In step 503, the clustering module 403 clusters the plurality of linear feature detections into at least one cluster (e.g., via network-based clustering based on area clustering). In one embodiment, the clustering module 403 can use a similarity metric based on location, orientation, and/or other designated attributes of the linear feature detections 109. In one example embodiment, the clustering module 403 generalizes the linear feature detections 109 into point-based vector features to determine the similarity of candidate linear feature detections 109 to group into a cluster. For example, the orientation and/or locations of the candidate linear feature detections 109 can be estimated based on an angle difference of each linear feature detection from other cluster locations.

In step 505, the clustering module 403 determines that at least one cluster forms a polygon. As discussed with respect to FIGS. 3A-3C, in one embodiment, some linear feature detection clusters can be broken into sub-clusters in order to better reflect the curvatures near the complex cartographic features such as but not limited to freeway interchanges. The system 100 applies the concept of closed boundary/polygon and open boundary/polygon that correspond to interior and exterior boundaries of a polygon constructed from a given set of linear feature detections 109 (e.g., lane marking detections) in a cluster.

Figure 7A:
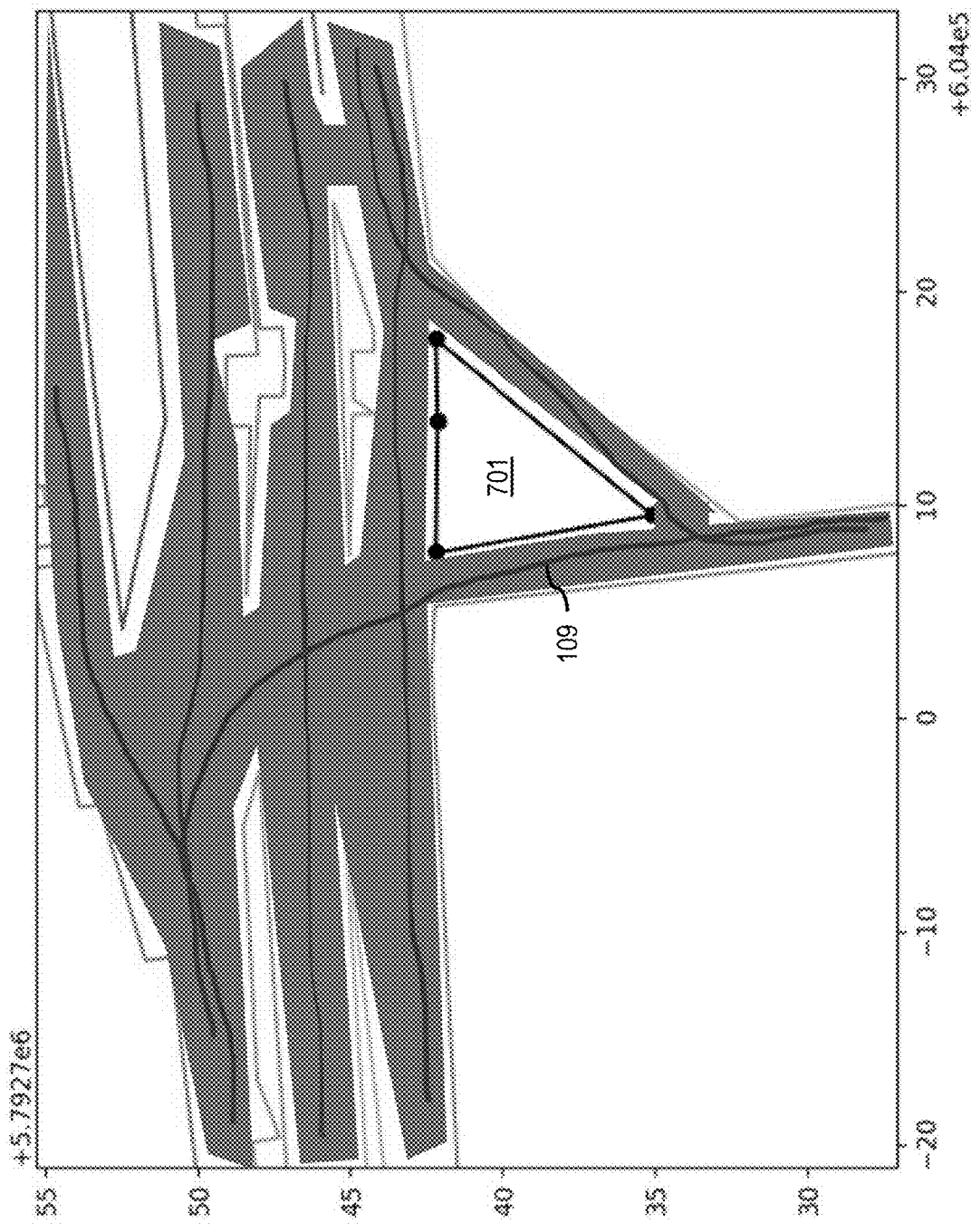
FIGS. 7A-7C are diagrams illustrating closed and open boundary polygons used for processing linear feature detections, according to one example embodiment.

In one embodiment, given linear feature detections 109 (e.g., lane marking detections) in a cluster, the clustering module 403 forms a polygon by the union of the linear feature detections in the cluster. In some embodiments, the clustering feature detections can apply a buffer size β (e.g., 1 meter or any other designated value). FIG. 7A is a diagram illustrating an example polygon 701 constructed from linear feature detections 109 (e.g., lane marking detections).

Figure 7B:
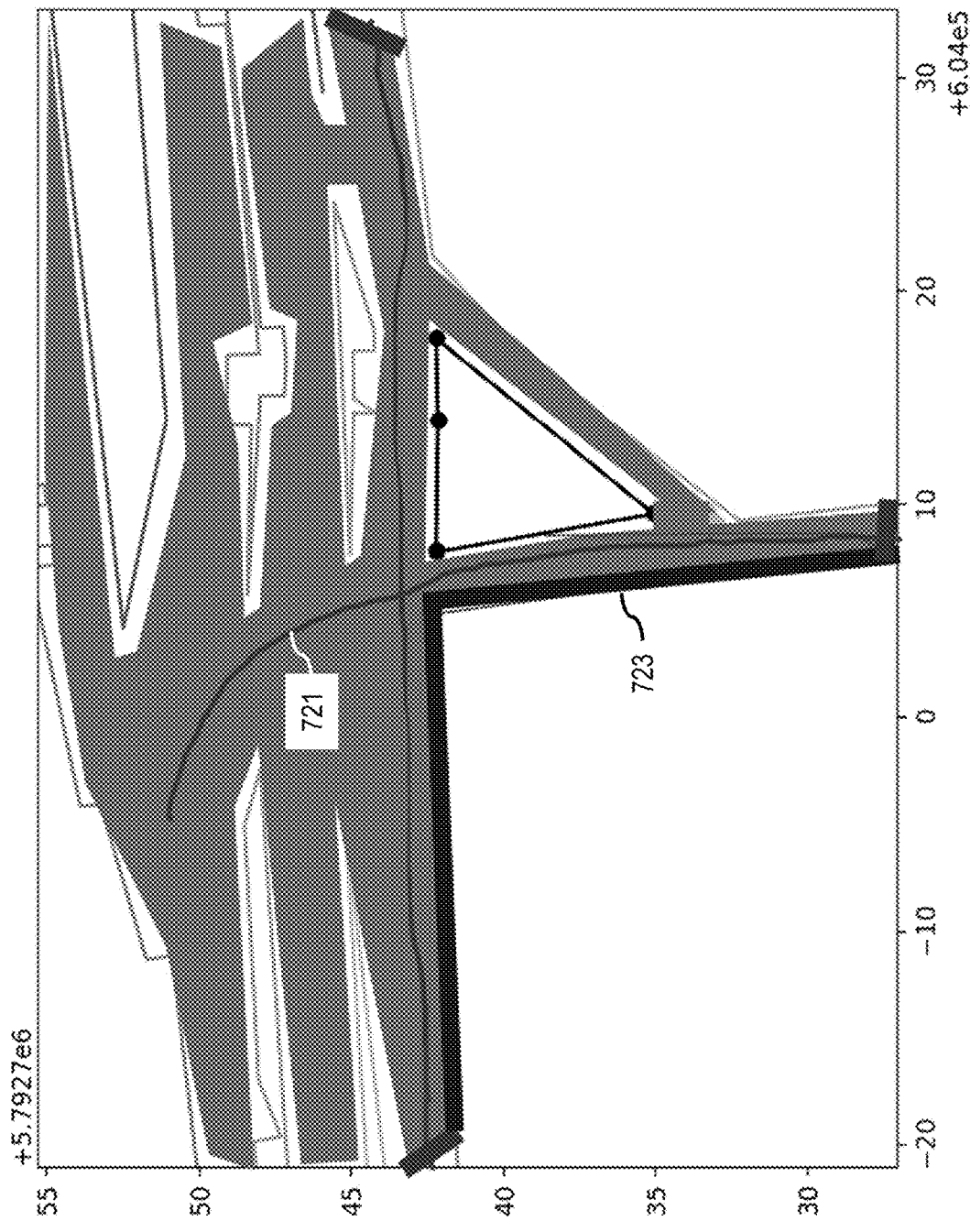

In one embodiment, polygon boundaries are classified to two groups: closing boundary and opening boundary. As used herein, a linear feature detection 109 (e.g., lane marking detection) can only intersect with an opening boundary, so it never intersects with a closing boundary. Based on these definitions, it is easy to classify a boundary geometry of a polygon as either an opening boundary or closing boundary. As shown in FIG. 7B, an opening boundary 721 is indicated in thinner black line and a closing boundary 723 is indicated in thick black line.

In step 507, the clustering module 403 cuts the polygon at one or more cut locations to form a plurality of sub-clusters of the plurality of linear feature detections. In one embodiment, the clustering module 403 uses a robust cut detection method to perform the polygon cut. For example, with the above information ready for a polygon and its closing boundaries, a robust cut detection method is used to extract the large inner areas in a cluster and divide the cluster. An example process is provided below by way of illustration and not as a limitation:

1. For each shapepoint of an inner area, identify if it is in a junction by
   a. First searching the closing boundary from an inner area or exterior area of the polygon;
   b. Filter out any line connection between the shapepoint and its closest location of the boundary if the polygon does not contain the line;
   c. Count the number of filtered boundaries; and
   d. If the count is equal to 2, the shapepoint is labeled as a non-intersection point, and otherwise the shapepoint is labeled as an intersection point indicating a junction;
2. Find all intervals of continuous non-intersection shapepoints;
3. Find the interval with longest distance;
4. Find the middle location on the longest interval with the mean distance; and
5. Generate a cut using the line formed in step 1.b.

Figure 7C:
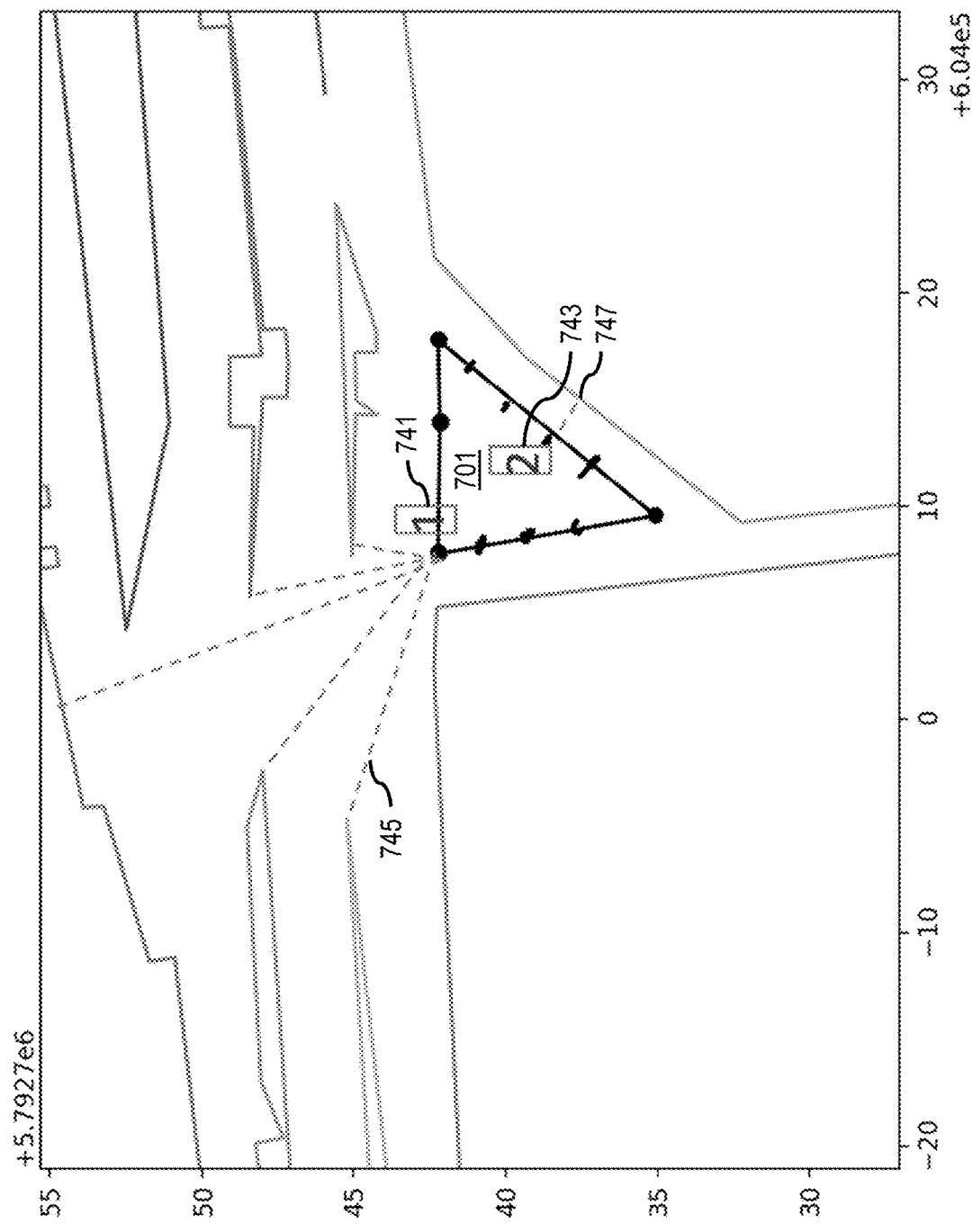

FIG. 7C is a diagram illustrating examples for an intersection point 741 (e.g., indicated by a box labeled [1]) and non-intersection point 743 (e.g., indicated by a box labeled [2]) for the inner area 701 with triangle. The multiple lines 745 as determined using step 1.b above are indicated using dashed and the cut 747 is the line generated in non-intersection point 743 indicated by another dashed line.

In one embodiment, the clustering module 403 uses a recursive logic for linear feature detection (e.g., lane marking detection) clustering with robust cuts. For example, in step 509, the clustering module 403 determines whether the sub-clusters form polygons. If there are polygons in the inner areas of at least one sub-cluster, the clustering module 403 performs a recursive cutting of the plurality of sub-clusters at one or more other cut locations based on determining that the plurality of sub-clusters from respective polygons (recursively return to step 507).

More specifically, after applying the robust cuts detected in step 507, the clustering module 403 can generate a new set of linear feature detections (e.g., lane marking detections) by breaking up some linear feature detections that intersect one of the given cuts into smaller pieces. With the new set of linear feature detections (e.g., lane marking detections), the clustering module 403 can run the connected component analysis on the network constructed to generate subclusters. As a result, the clustering module 403 can recursively generate clusters by applying cuts.

In one embodiment, the cutting is performed with a designated buffer length applied at the one or more cut locations. For example, for each cut, the clustering module 403 breaks up linear feature detections (e.g., lane marking detections) that intersects the cut, and shrinks both sides of the linear feature detections (e.g., lane marking detections) away from the intersecting/cut point or location with a buffer (e.g., 1 meter or any other designated value), so that in the next recursive step the cut region will be excluded in the polygon that is formed on the new set of linear feature detections (e.g., lane marking detections).

Figure 8:
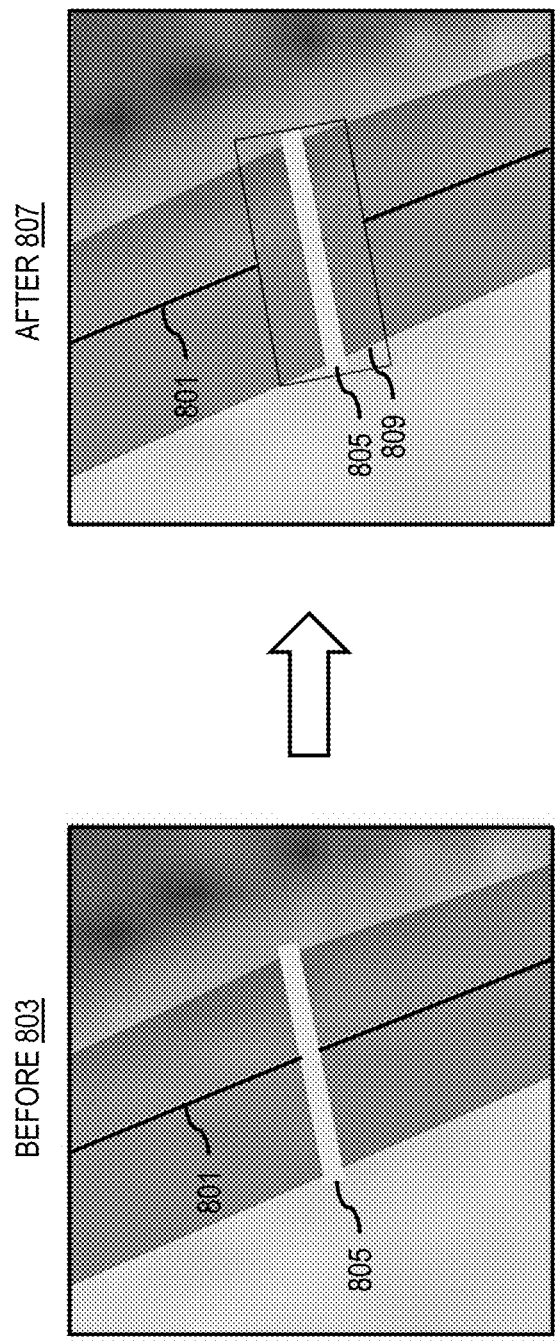
FIG. 8 is a diagram illustrating examples of applying a cut to linear feature detections, according to one example embodiment.

FIG. 8 is a diagram illustrating an example of applying a cut to linear feature detections, according to one example embodiment. In this example, the linear feature detection 801 is shown before 803 the cut 805 is applied. After 807 the cut 805 is applied to linear feature detection 801 with buffer 809, the cut pieces of the linear feature detection 801 are drawn back by the length of the buffer 809 on each side of the cut 805.

Figure 9B:
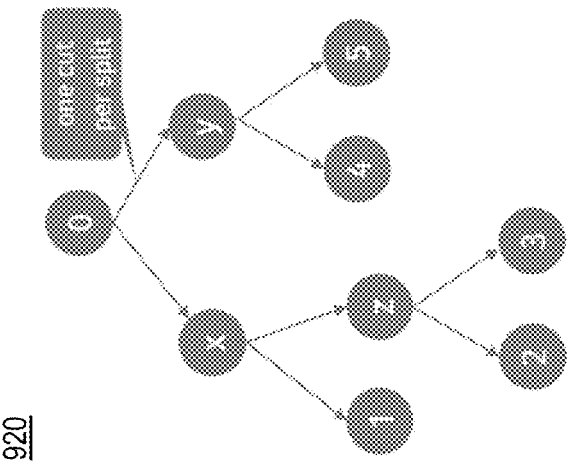
FIGS. 9A and 9B are diagrams illustrating examples of recursive clustering with cuts, according to one example embodiment.
Figure 9A:
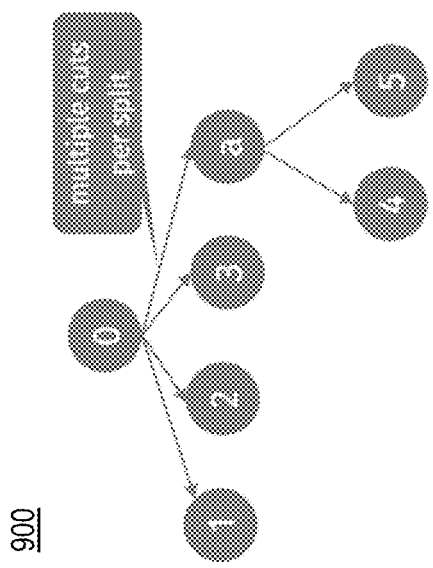

In one embodiment, the clustering module 403 can perform the recursive clustering with robust cuts using various depth first search strategies tested, as shown in FIGS. 9A and 9B which are diagrams illustrating examples of recursive clustering with cuts, according to one example embodiment. FIG. 9A illustrates a first strategy 900 that applies cuts extracted from all inner areas at once (e.g., the recursive cutting is performed all at once). Under this strategy 900, cuts to the initial cluster 0 are performed all at once to produce sub-clusters 1, 2, 3, and a at the same time. Then, cuts to the resulting sub-cluster a are performed all at once to produce sub-clusters 4 and 5. FIG. 9B illustrates a second strategy 920 that applies one cut per recursive step. Under this strategy 920, a single cut to the initial cluster 0 is performed at the first recursive step to produce sub-clusters x and y. Then, a cut to sub-cluster x is performed at the next recursive step to produce sub-clusters 1 and z. At the next recursive step, a cut to sub-cluster z is performed to produce sub-clusters 2 and 3. At the final recursive step, a cut to sub-cluster y is performed to produce sub-clusters 4 and 5. The termination condition of the recursive logic is that during the polygon creation, if no inner area is found in the polygon, the recursion is terminated.

The second strategy 920 that applies one cut per recursive step has many advantages:
1. Avoids cuts extracted from the same polygon interior; and
2. Is easy to apply prior knowledge
    1) Extract cut from large polygon interior first;
    2) Filter out long cut (e.g., cut length>10 m, two lanes with 2 meters buffer); and
    3) Filter out the cut if it is close to previous used cuts.

After the recursive cutting of step 509 is complete, the clustering module 403 extracts respective centerlines for the plurality of sub-clusters (step 511). In the final step, the sub-clusters from the last step will be further aggregated to extract the centerline of the linear feature detections (e.g., lane marking detections). Those centerlines will reflect the overall location and heading features from all sources.

From the centerlines, the cut areas between the sub-clusters are smoothly connected. For example, in step 513, the graph module 405 connects the respective centerlines at the one or more cut locations to generate a network graph of the one or more linear features.

In step 515, the output module 407 provides the network graph (e.g., network graph data 121) and/or the linear feature detections 109 as an output. In one embodiment, the mapping platform 101 can use the network graph data 121 and/or linear feature detections 109 to generate digital map data of the linear features (e.g., lane markings) for storage in the geographic database 103. The network graph data 121, linear feature detections 109, and/or digital map data of the geographic database 103 derived therefrom can then be provided to or otherwise accessed by one or more components with connectivity to the system 100 including but not limited to the services platform 125, services 127, content providers 129, vehicles 105, UEs 107, and/or the like.

For example, the network graph data 121 and/or linear feature detections 109 stored in the geographic database 103 can be accessed over the communication network 123 by the vehicle 105 for autonomous driving applications, lane-level navigation, lane-level positioning, and/or the like. In another example embodiment, a services platform 125, one or more services 127, and/or one or more content providers 129 can access the network graph data 121 and/or linear feature detections 109 of the geographic database 103 to perform one or more functions (e.g., location-based functions).

Returning to FIG. 1, in one embodiment, the mapping platform 101 has connectivity over the communication network 123 to the services platform 125 that provides one or more services 127) (e.g., probe and/or sensor data collection services, and/or any other location-based/navigation services). By way of example, the services 127 may also be other third-party services and include mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 125 uses the output (e.g., graph network data, linear feature representations, linear feature orientation estimations, linear feature location estimations, etc.) of the mapping platform 101 to provide services such as navigation, mapping, other location-based services, etc.

In one embodiment, the mapping platform 101 may be a platform with multiple interconnected components. The mapping platform 101 may include multiple servers, intelligent networking devices, computing devices, components, and corresponding software for providing parametric representations of lane lines. In addition, it is noted that the mapping platform 101 may be a separate entity of the system 100, a part of the services platform 125, a part of the one or more services 127, or included within the vehicles 105 (e.g., an embedded navigation system).

In one embodiment, content providers 129 may provide content or data (e.g., including probe data, sensor data, etc.) to the mapping platform 101, the UEs 107, the applications 117, the geographic database 103, the services platform 125, the services 127, and the vehicles 105. The content provided may be any type of content, such as map content, textual content, audio content, video content, image content, etc. In one embodiment, the content providers 129 may provide content that may aid in reconstructing linear features of a road. In one embodiment, the content providers 129 may also store content associated with the mapping platform 101, the geographic database 103, the services platform 125, the services 127, and/or the vehicles 105. In another embodiment, the content providers 129 may manage access to a central repository of data, and offer a consistent, standard interface to data, such as a repository of the geographic database 103.

By way of example, the UEs 107 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 107 can support any type of interface to the user (such as "wearable" circuitry, etc.). In one embodiment, a UE 107 may be associated with a vehicle 105 (e.g., a mobile device) or be a component part of the vehicle 105 (e.g., an embedded navigation system). In one embodiment, the UEs 107 may include the mapping platform 101 to provide lane-level mapping/routing based on route identification information determined from unordered line data.

In one embodiment, as mentioned above, the vehicles 105, for instance, are part of a system for collecting image data and/or other sensor data (e.g., comprising line data) for linear feature reconstruction. The image data and/or linear feature detections 109 generated from image data can be reported from the vehicles 105 in real-time, in batches, continuously, or at any other frequency requested by the system 100 over, for instance, the communication network 123 for processing by the mapping platform 101. The image data and/or linear feature detections 109 also can be map matched to specific road link segments stored in the geographic database 103 according to the embodiments described herein.

In one embodiment, the vehicles 105 and/or UEs 107 are configured with various sensors 108 for generating or collecting linear feature detections 109, image data, probe data, sensor data, related geographic/map data, etc. In one embodiment, the sensed data represents sensor data associated with a geographic location or coordinates at which the sensor data was collected. By way of example, the vehicle sensors may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 105, switch sensors for determining whether one or more vehicle switches are engaged, and the like. Though depicted as automobiles, it is contemplated the vehicles 105 can be any type of vehicle manned or unmanned (e.g., cars, trucks, buses, vans, motorcycles, scooters, drones, etc.) that travel through road segments of a road network.

Other examples of sensors of the vehicle 105 may include light sensors, orientation sensors augmented with height sensors and acceleration sensor (e.g., an accelerometer can measure acceleration and can be used to determine orientation of the vehicle), tilt sensors to detect the degree of incline or decline of the vehicle 105 along a path of travel (e.g., while on a hill or a cliff), moisture sensors, pressure sensors, etc. In a further example embodiment, sensors about the perimeter of the vehicle 105 may detect the relative distance of the vehicle 105 from a physical divider, a lane line of a link or roadway, any other linear feature of the road,), vehicle paths, the presence of other vehicles, pedestrians, traffic lights, potholes and any other objects, or a combination thereof. In one scenario, the vehicle sensors may detect weather data, traffic information, or a combination thereof. In one embodiment, the vehicles 105 may include GPS or other satellite-based receivers to obtain geographic coordinates from satellites 112 for determining current location and time. Further, the location can be determined by visual odometry, triangulation systems such as A-GPS, Cell of Origin, or other location extrapolation technologies.

In one embodiment, the UEs 107 may also be configured with various sensors (not shown for illustrative convenience) for acquiring and/or generating probe data and/or sensor data associated with a vehicle 105, a driver, other vehicles, conditions regarding the driving environment or roadway, etc. For example, such sensors may be used as GPS receivers for interacting with the one or more satellites 119 to determine and track the current speed, position, and location of a vehicle 105 travelling along a link or roadway. In addition, the sensors may gather tilt data (e.g., a degree of incline or decline of the vehicle during travel), motion data, light data, sound data, image data, weather data, temporal data and other data associated with the vehicles 105 and/or UEs 107. Still further, the sensors may detect local or transient network and/or wireless signals, such as those transmitted by nearby devices during navigation of a vehicle along a roadway (Li-Fi, near field communication (NFC)) etc.

It is noted therefore that the above-described data may be transmitted via communication network 123 as linear feature detections 109 or associated sensor data according to any known wireless communication protocols. For example, each UE 107, application 117, user, and/or vehicle 105 may be assigned a unique probe identifier (probe ID) for use in reporting or transmitting said linear feature detections 109 and/or associated sensor data collected by the vehicles 105 and/or UEs 107.

In one embodiment, the mapping platform 101 retrieves aggregated linear feature detections 109 and/or associated sensor data gathered and/or generated by the sensors 108 and/or the UE 107 resulting from the travel of the UEs 107 and/or vehicles 105 on a road segment of a road network. In one instance, the geographic database 103 stores a plurality of linear feature detections 109 and/or associated sensor data generated by different vehicle sensors, UEs 107, applications 117, vehicles 105, etc. over a period while traveling in a monitored area.

In one embodiment, the communication network 123 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 105, mapping platform 101, UEs 107, applications 117, services platform 125, services 127, and/or content providers 129 communicate with each other and other components of the system 100 using well known, new or still developing protocols. In this context, a protocol includes a set of rules defining how the network nodes within the communication network 123 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 10:
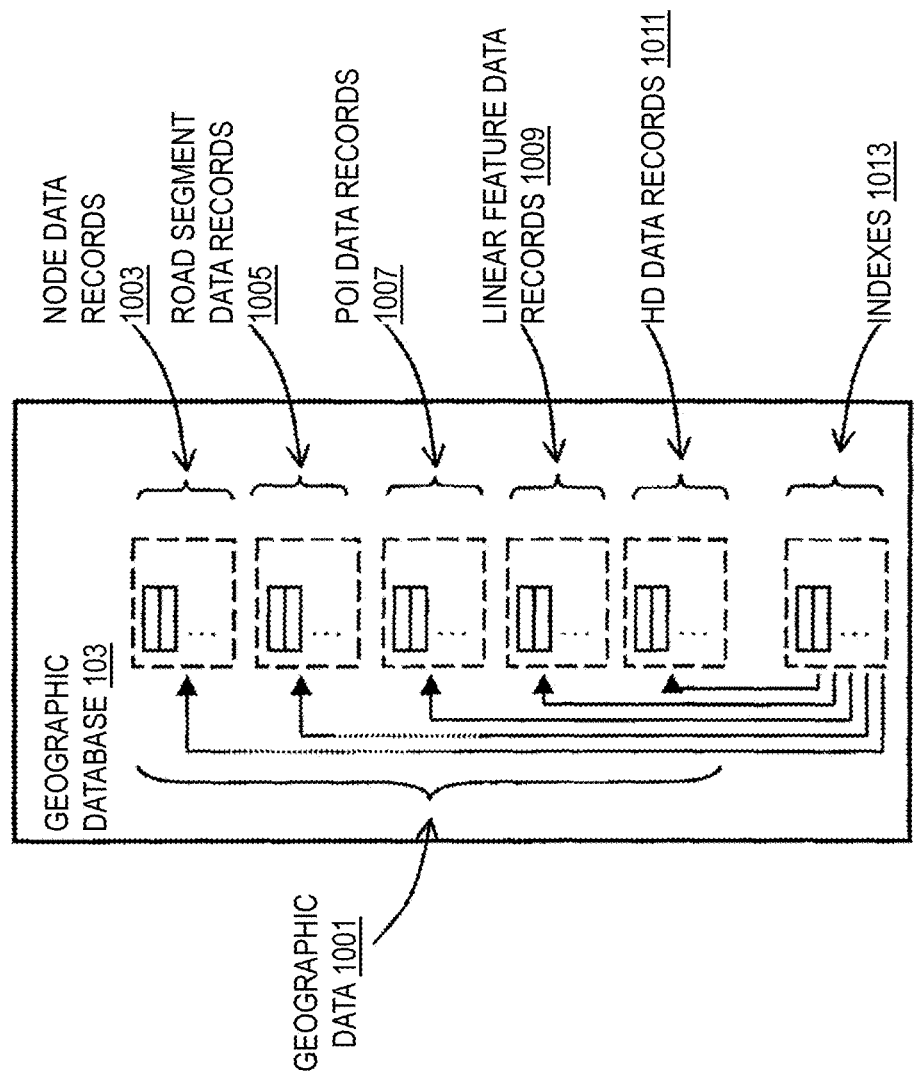
FIG. 10 is a diagram of a geographic database, according to one embodiment.

FIG. 10 is a diagram of a geographic database 103, according to one embodiment. In one embodiment, the geographic database 103 includes geographic data 1001 used for (or configured to be compiled to be used for) mapping and/or navigation-related services, such as for video odometry based on the parametric representation of lanes include, e.g., encoding and/or decoding parametric representations into lane lines. In one embodiment, the geographic database 103 includes high resolution or high definition (HD) mapping data that provide centimeter-level or better accuracy of map features. For example, the geographic database 103 can be based on Light Detection and Ranging (LiDAR) or equivalent technology to collect billions of 3D points and model road surfaces and other map features down to the number lanes and their widths. In one embodiment, the HD mapping data (e.g., HD data records 1011) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional, or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 103.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alert a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 103 follows certain conventions. For example, links do not cross themselves and do not cross each other except at a node. Also, there are no duplicated shape points, nodes, or links. Two links that connect each other have a common node. In the geographic database 103, overlapping geographic features are represented by overlapping polygons. When polygons overlap, the boundary of one polygon crosses the boundary of the other polygon. In the geographic database 103, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 103 includes node data records 1003, road segment or link data records 1005, POI data records 1007, linear feature data records 1009, HD mapping data records 1011, and indexes 1013, for example. More, fewer, or different data records can be provided. In one embodiment, additional data records (not shown) can include cartographic ("carto") data records, routing data, and maneuver data. In one embodiment, the indexes 1013 may improve the speed of data retrieval operations in the geographic database 103. In one embodiment, the indexes 1013 may be used to quickly locate data without having to search every row in the geographic database 103 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points (such as representing intersections, respectively) corresponding to the respective links or segments of the road segment data records 1005. The road link data records 1005 and the node data records 1003 represent a road network, such as used by vehicles, cars, and/or other entities. Alternatively, the geographic database 103 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 103 can include data about the POIs and their respective locations in the POI data records 1007. The geographic database 103 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the geographic database 103 can also include linear feature data records 1009 for storing the constructed linear feature representations, linear feature detections 109, linear feature orientations, linear feature locations, network graph data 121, and/or any other data generated or used by the system 100 according to the various embodiments described herein. By way of example, the linear feature data records 1009 can be associated with one or more of the node records 1003, road segment records 1005, and/or POI data records 1007 to support autonomous driving or other location-based applications based on the features stored therein. In this way, the linear feature data records 1009 can also be associated with or used to classify the characteristics or metadata of the corresponding records 1003, 1005, and/or 1007.

In one embodiment, as discussed above, the HD mapping data records 1011 model road surfaces and other map features to centimeter-level or better accuracy. The HD mapping data records 1011 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 1011 are divided into spatial partitions of varying sizes to provide HD mapping data to vehicles 105 and other end user devices with near real-time speed without overloading the available resources of the vehicles 105 and/or devices (e.g., computational, memory, bandwidth, etc. resources).

In one embodiment, the HD mapping data records 1011 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1011.

In one embodiment, the HD mapping data records 1011 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 103 can be maintained by the content provider 129 in association with the services platform 125 (e.g., a map developer). The map developer can collect geographic data to generate and enhance the geographic database 103. There can be different ways used by the map developer to collect data. These ways can include obtaining data from other sources, such as municipalities or respective geographic authorities. In addition, the map developer can employ field personnel to travel by vehicle (e.g., vehicles 105 and/or UEs 107) along roads throughout the geographic region to observe features and/or record information about them, for example. Also, remote sensing, such as aerial or satellite photography, can be used.

The geographic database 103 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 105 or a UE 107, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing linear feature detection of cartographic features may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular device, other network device, and/or other computing device.

Figure 11:
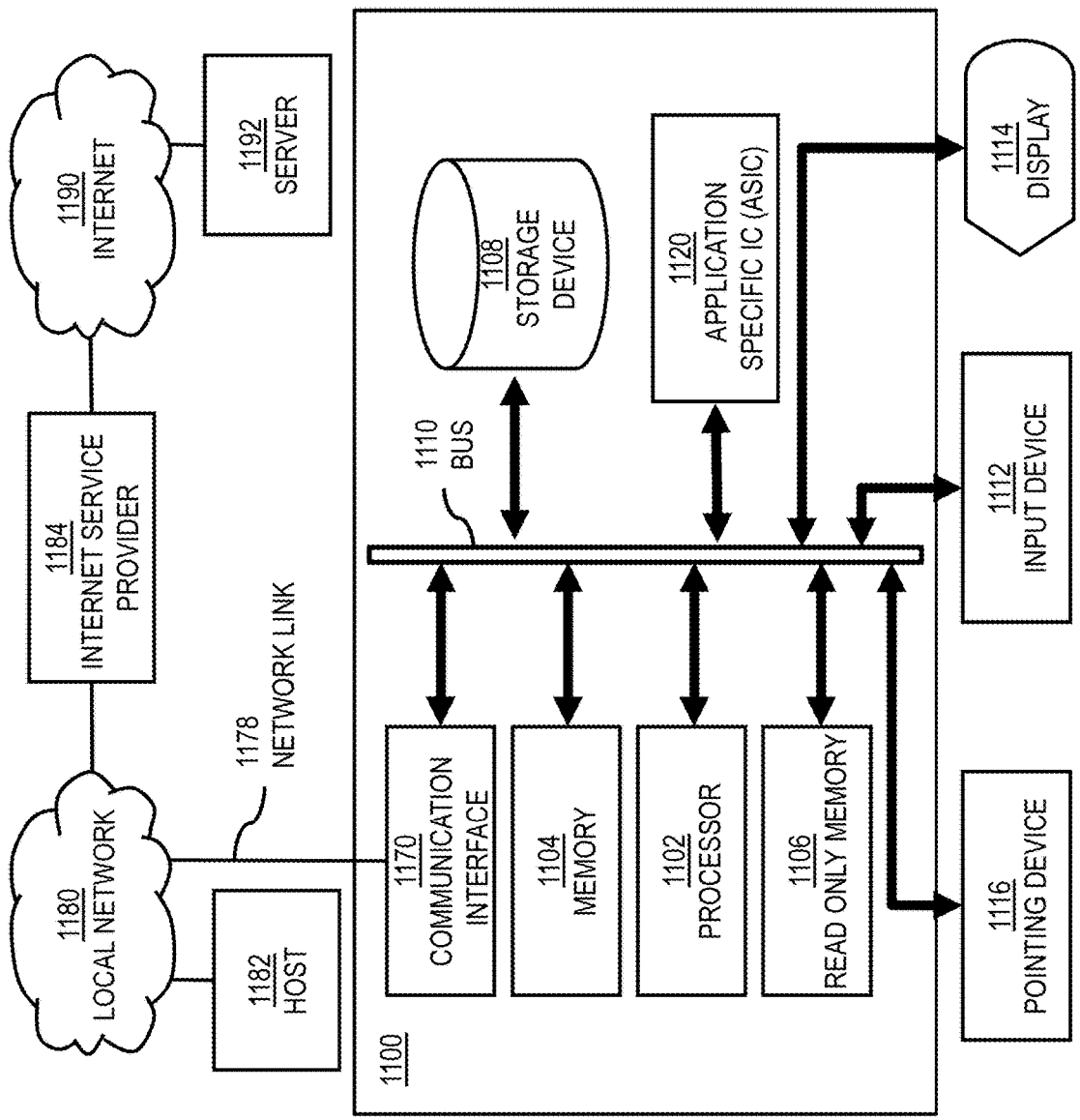
FIG. 11 is a diagram of hardware that can be used to implement an embodiment.

FIG. 11 illustrates a computer system 1100 upon which an embodiment of the invention may be implemented. Computer system 1100 is programmed (e.g., via computer program code or instructions) to provide linear feature detection of cartographic features as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to providing linear feature detection of cartographic features. The computer program code is a set of instructions or statements providing instructions for the operation of the processor and/or the computer system to perform specified functions. The code, for example, may be written in a computer programming language that is compiled into a native instruction set of the processor 1102. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for providing linear feature detection of cartographic features. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing linear feature detection of cartographic features, is provided to the bus 1110 for use by the processor from an external input device 1112, such as a keyboard containing alphanumeric keys operated by a human user, or a sensor. A sensor detects conditions in its vicinity and transforms those detections into physical expressions compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 123 for providing linear feature detection of cartographic features.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104.

Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system can be deployed in various configurations within other computer systems, e.g., host 1182 and server 1192.

FIG. 12 illustrates a chip set 1200 upon which an embodiment of the invention may be implemented. Chip set 1200 is programmed to provide linear feature detection of cartographic features as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to perform specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide linear feature detection of cartographic features. The memory 1205 also stores the data associated with or generated by the execution of the inventive steps.

Figure 13:
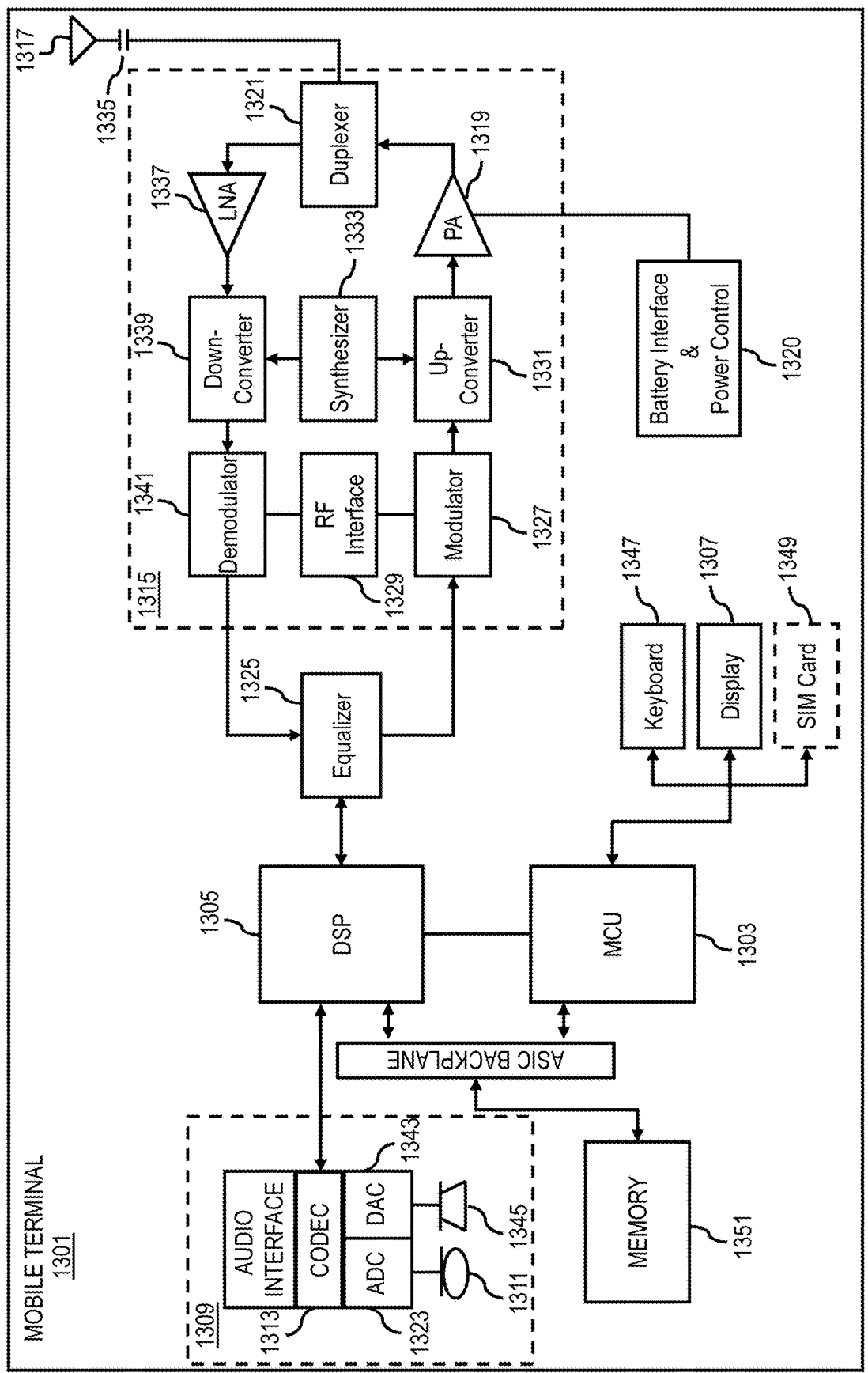
FIG. 13 is a diagram of a mobile terminal (e.g., handset or vehicle or part thereof) that can be used to implement an embodiment.

FIG. 13 is a diagram of exemplary components of a mobile terminal 1301 (e.g., a UE 107, vehicle 105, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with an RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to provide linear feature detection of cartographic features. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving a plurality of linear feature detections, wherein the plurality of linear features detections represents one or more linear features of a geographic environment that are detected using at least one sensor;
designating a linear feature detection pair comprising two of the plurality of linear feature detections;
performing a classification of the linear feature detection pair as a must-link pair or a cannot-link pair, wherein the classification is based on satisfying a predetermined intersecting length as a total length of a first linear feature of a first linear feature detection of the two of the plurality of linear feature detections within a predetermined area corresponding to a second linear feature of a second linear feature detection of the two of the plurality of linear feature detections, wherein the classification of the cannot-link pair is based on one or more linear feature detection pairs that should not be grouped together;
clustering the plurality of linear feature detections into at least one cluster, wherein the clustering of the plurality of linear feature detections is based on the classification;
determining that the at least one cluster forms a polygon;
cutting the polygon at one or more cut locations to form a plurality of sub-clusters of the plurality of linear feature detections;
extracting respective centerlines for the plurality of sub-clusters;
connecting the respective centerlines at the one or more cut locations to generate a network graph of the one or more linear features; and
providing the network graph as an output for generating and storing digital map data in a geographic database.

2. The method of claim 1, further comprising:
performing a recursive cutting of the plurality of sub-clusters at one or more other cut locations based on determining that the plurality of sub-clusters forms respective polygons,
wherein the extracting and the connecting of the respective centerlines is based on the recursive cutting.

3. The method of claim 2, wherein the recursive cutting is performed all at once.

4. The method of claim 2, wherein the recursive cutting is performed such that one cut is performed per a recursive step.

5. The method of claim 1, wherein the cutting is performed with a designated buffer length applied at the one or more cut locations.

6. The method of claim 1, wherein the one or more linear features includes one or more lane markings.

7. An apparatus comprising:
at least one processor; and
at least one memory including computer program code for one or more programs,
the at least one memory and the computer program code configured to, with the at least one processor, cause the apparatus to perform at least the following,
receive a plurality of linear feature detections, wherein the plurality of linear features detections represents one or more linear features of a geographic environment that are detected using at least one sensor;
designate one or more linear feature detection pairs comprising two different linear feature detections of the plurality of linear feature detections;
perform a classification of one or more linear feature detection pairs into a must-link category or a cannot-link category, wherein the classification is based on satisfying a predetermined intersecting length as a total length of a first linear feature of a first linear feature detection of the two of the plurality of linear feature detections within a predetermined area corresponding to a second linear feature of a second linear feature detection of the two of the plurality of linear feature detections, wherein the classification of the cannot-link pair is based on one or more linear feature detection pairs that should not be grouped together;
cluster the plurality of linear feature detections into at least one cluster based on the classification; and
generate a network graph of the one or more linear features based on the clustering for generation and storage of digital map data in a geographic database.

8. The apparatus of claim 7, wherein the apparatus is further caused to:
determine that the at least one cluster forms a polygon;
cut the polygon at one or more cut locations to form a plurality of sub-clusters of the plurality of linear feature detections;
extract respective centerlines for the plurality of sub-clusters; and
connect the respective centerlines at the one or more cut locations to generate the network graph.

9. The apparatus of claim 8, wherein the apparatus is further caused to:
perform a recursive cutting of the plurality of sub-clusters at one or more other cut locations based on determining that the plurality of sub-clusters from respective polygons,
wherein the extracting and the connecting of the respective centerlines is based on the recursive cutting.

10. A non-transitory computer-readable storage medium, carrying one or more sequences of one or more instructions which, when executed by one or more processors, cause an apparatus to at least perform the following steps:
receiving a plurality of linear feature detections, wherein the plurality of linear features detections represents one or more linear features of a geographic environment that are detected using at least one sensor;
designating a linear feature detection pair comprising two of the plurality of linear feature detections;
performing a classification of the linear feature detection pair as a must-link pair or a cannot-link pair, wherein the classification is based on satisfying a predetermined intersecting length as a total length of a first linear feature of a first linear feature detection of the two of the plurality of linear feature detections within a predetermined area corresponding to a second linear feature of a second linear feature detection of the two of the plurality of linear feature detections, wherein the classification of the cannot-link pair is based on one or more linear feature detection pairs that should not be grouped together;
clustering the plurality of linear feature detections into at least one cluster, wherein the clustering of the plurality of linear feature detections is based on the classification;
determining that the at least one cluster forms a polygon;
cutting the polygon at one or more cut locations to form a plurality of sub-clusters of the plurality of linear feature detections;

extracting respective centerlines for the plurality of sub-clusters;
connecting the respective centerlines at the one or more cut locations to generate a network graph of the one or more linear features; and
providing the network graph as an output for generating and storing digital map data in a geographic database.

11. The non-transitory computer-readable storage medium of claim 10, wherein the apparatus is caused to further perform:
performing a recursive cutting of the plurality of sub-clusters at one or more other cut locations based on determining that the plurality of sub-clusters from respective polygons,
wherein the extracting and the connecting of the respective centerlines is based on the recursive cutting.

12. The non-transitory computer-readable storage medium of claim 11, wherein the recursive cutting is performed all at once.

13. The non-transitory computer-readable storage medium of claim 11, wherein the recursive cutting is performed such that one cut is performed per a recursive step.

* * * * *